United States Patent
Ishizuka et al.

(10) Patent No.: US 6,292,870 B1
(45) Date of Patent: *Sep. 18, 2001

(54) INFORMATION PROCESSING SYSTEM IN WHICH MEMORY DEVICES AND COPIES OF TAGS ARE ACCESSED IN RESPONSE TO ACCESS REQUESTS ISSUED FROM PLURALITY OF PROCESSING UNITS

(75) Inventors: Takaharu Ishizuka; Takato Noda; Yasuhide Shibata; Takumi Takeno; Katsunori Takeshita; Fumitake Sugano, all of Kawasaki (JP)

(73) Assignee: Fijitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/020,678

(22) Filed: Feb. 9, 1998

(30) Foreign Application Priority Data

Aug. 29, 1997 (JP) ................................................ 9-235101

(51) Int. Cl.[7] .................................................. G06F 12/08
(52) U.S. Cl. .......................... 711/128; 711/145; 711/127
(58) Field of Search .................................. 711/5, 1, 121, 711/127, 128, 144, 145, 147, 148, 149, 150, 153, 156, 157, 173; 712/224; 710/101; 365/49

(56) References Cited

U.S. PATENT DOCUMENTS

| | | | |
|---|---|---|---|
| 4,426,681 | * 1/1984 | Bacot et al. | 711/130 |
| 4,783,736 | 11/1988 | Ziegler et al. | |
| 4,853,846 | * 8/1989 | Johnson et al. | 710/101 |
| 4,939,641 | * 7/1990 | Schwartz et al. | 711/146 |
| 5,130,922 | * 7/1992 | Liu | 711/144 |
| 5,222,224 | * 6/1993 | Flynn et al. | 711/144 |
| 5,241,664 | * 8/1993 | Ohba et al. | 711/121 |
| 5,761,724 | * 6/1998 | Jhon et al. | 711/144 |
| 5,905,998 | * 5/1999 | Ebrahim et al. | 711/144 |

FOREIGN PATENT DOCUMENTS

| | | |
|---|---|---|
| 4-117540 | 4/1992 | (JP) . |
| 62-187946 | 8/1997 | (JP) . |

* cited by examiner

Primary Examiner—B. James Peikari
(74) Attorney, Agent, or Firm—Staas & Halsey LLP

(57) ABSTRACT

Processing units each having a first memory and a system controller are interconnected over a bus. The system controller includes access control units for controlling access to copies of tags of the first memories in the processing units and access to second memories to which a plurality of ways lead, and thus controls access to memories or memory access requested by the processing units. In the information processing system, a plurality of memory interfaces are included for enabling access to the second memories on an interleaving basis. Furthermore, the same numbers of copies of tags and memory access control units as the number of memory interfaces are included for enabling access to tags on the interleaving basis. Since access to the memories and tags on the interleaving basis is thus enabled, even if the number of processing units increases, competition for the memory access control units subsides and the efficiency of memory access improves.

10 Claims, 35 Drawing Sheets

Fig.7A MASKING CIRCUIT ON WAY₀ 12₀m
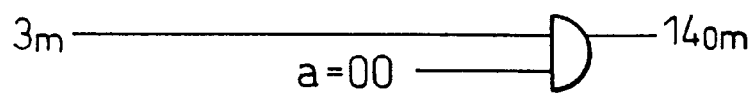
Fig.7B MASKING CIRCUIT ON WAY₁ 12₁m
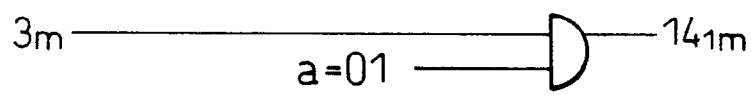
Fig.7C MASKING CIRCUIT ON WAY₂ 12₂m
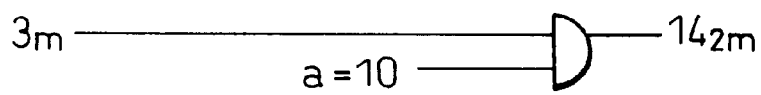
Fig 7D MASKING CIRCUIT ON WAY₃ 12₃m
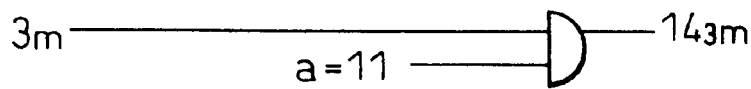

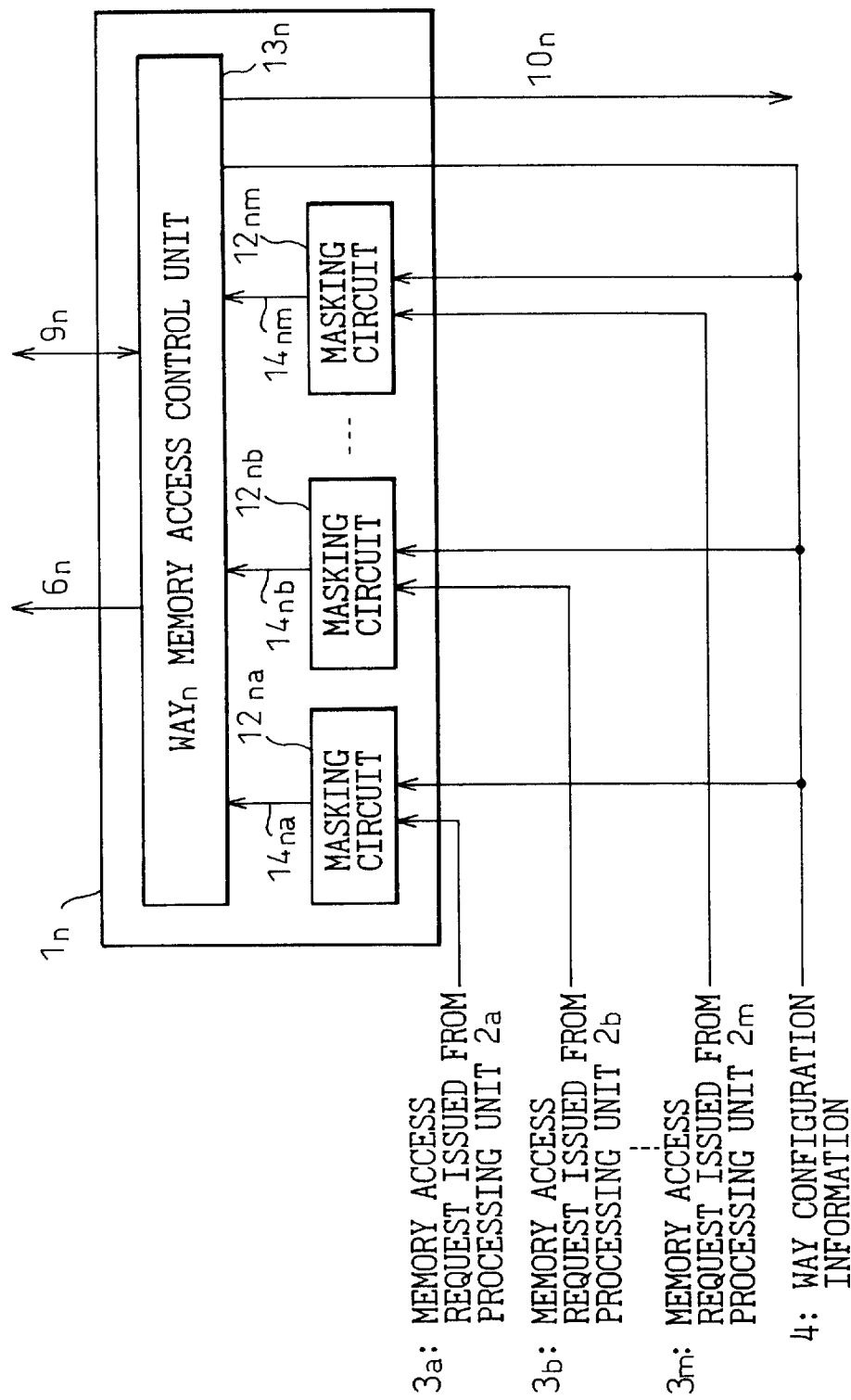

Fig.11A
MASKING CIRCUIT ON WAY$_0$ 12$_{0m}$
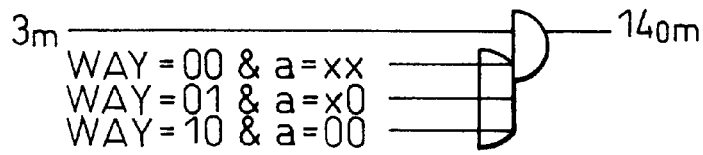
Fig.11B
MASKING CIRCUIT ON WAY$_1$ 12$_{1m}$
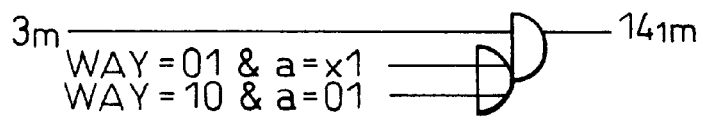
Fig.11C
MASKING CIRCUIT ON WAY$_2$ 12$_{2m}$
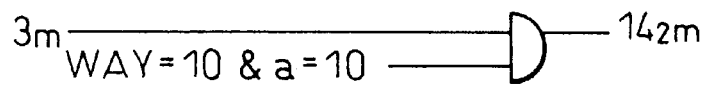
Fig.11D
MASKING CIRCUIT ON WAY$_3$ 12$_{3m}$
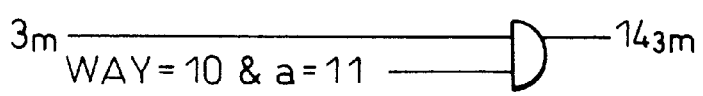
Fig.12
WAY CONFIGURATION INFORMATION
| WAY<1:0> | NUMBER OF WAYS |
|---|---|
| 00 | 1 WAY |
| 01 | 2 WAY |
| 10 | 4 WAY |

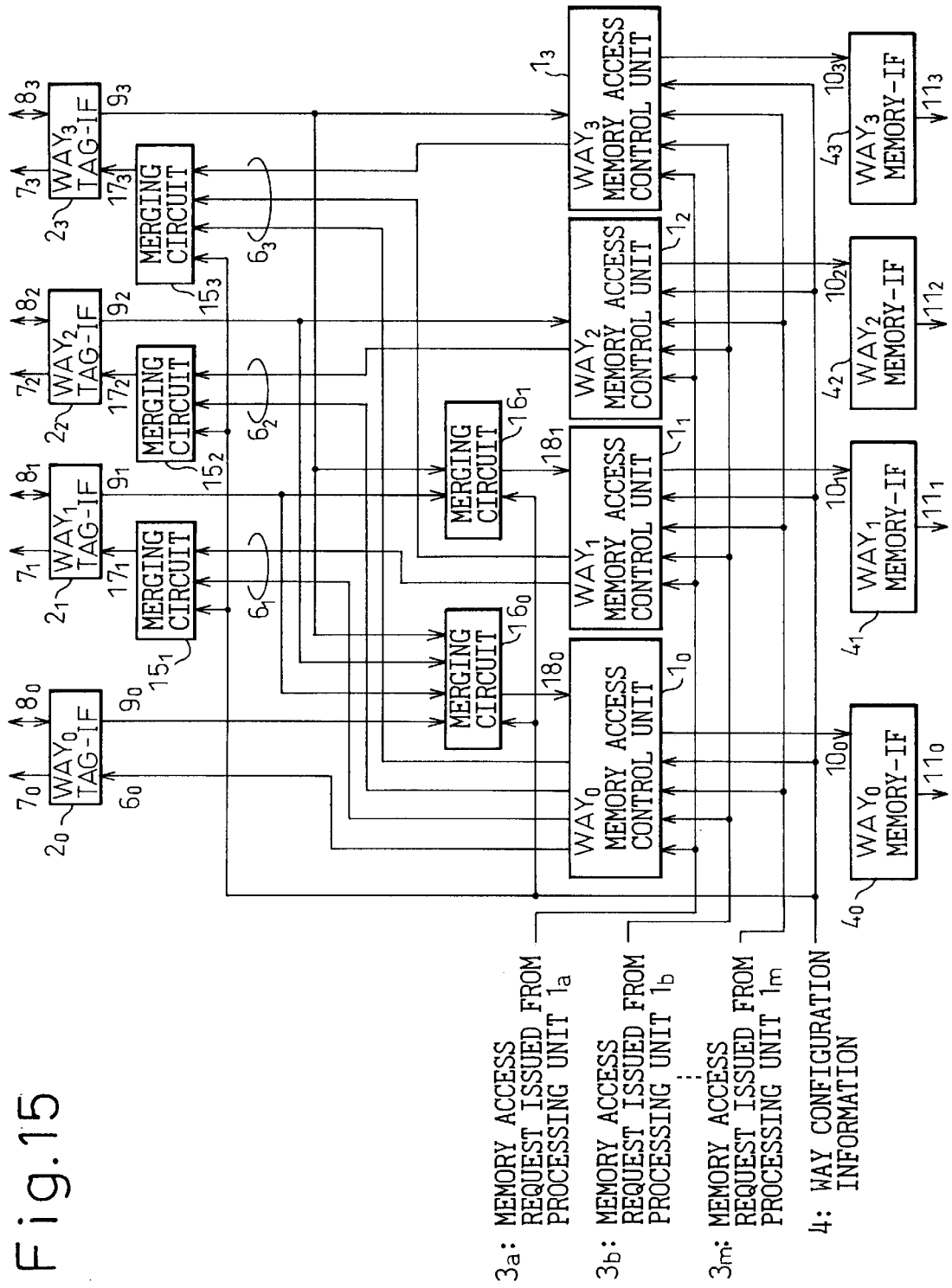

DESTINATION DETERMINATION
CIRCUIT $19_0$

DESTINATION DETERMINATION
CIRCUIT $19_1$

Fig.22A

| a | WAY$_0$ MEMORY ACCESS CONTROL UNIT 1$_0$ | WAY$_1$ MEMORY ACCESS CONTROL UNIT 1$_1$ | WAY$_2$ MEMORY ACCESS CONTROL UNIT 1$_2$ | WAY$_3$ MEMORY ACCESS CONTROL UNIT 1$_3$ |
|---|---|---|---|---|
| 00 | ○ T0 M0 | × | × | × |
| 01 | ○ T1 M0 | × | × | × |
| 10 | ○ T2 M0 | × | × | × |
| 11 | ○ T3 M1 | × | × | × |

Fig.22B

| a | WAY$_0$ MEMORY ACCESS CONTROL UNIT 1$_0$ | WAY$_1$ MEMORY ACCESS CONTROL UNIT 1$_1$ | WAY$_2$ MEMORY ACCESS CONTROL UNIT 1$_2$ | WAY$_3$ MEMORY ACCESS CONTROL UNIT 1$_3$ |
|---|---|---|---|---|
| 00 | ○ T0 M0 | × | × | × |
| 01 | × | ○ T1 M1 | × | × |
| 10 | ○ T2 M0 | × | × | × |
| 11 | × | ○ T3 M1 | × | × |

Fig.22C

| a | WAY$_0$ MEMORY ACCESS CONTROL UNIT 1$_0$ | WAY$_1$ MEMORY ACCESS CONTROL UNIT 1$_1$ | WAY$_2$ MEMORY ACCESS CONTROL UNIT 1$_2$ | WAY$_3$ MEMORY ACCESS CONTROL UNIT 1$_3$ |
|---|---|---|---|---|
| 00 | ○ T0 M0 | × | × | × |
| 01 | × | ○ T1 M1 | × | × |
| 10 | × | × | ○ T2 M2 | × |
| 11 | × | × | × | ○ T3 M3 |

○: MEMORY ACCESS CONTROL UNIT IS ACTIVATED.
×: MEMORY ACCESS CONTROL UNIT IS NOT ACTIVATED.
T$_n$: MEMORY ACCESS CONTROL UNIT ACTIVATES TAG INTERFACE ON WAY$_n$.
M$_n$: MEMORY ACCESS CONTROL UNIT ACTIVATES MEMORY INTERFACE ON WAY$_n$.

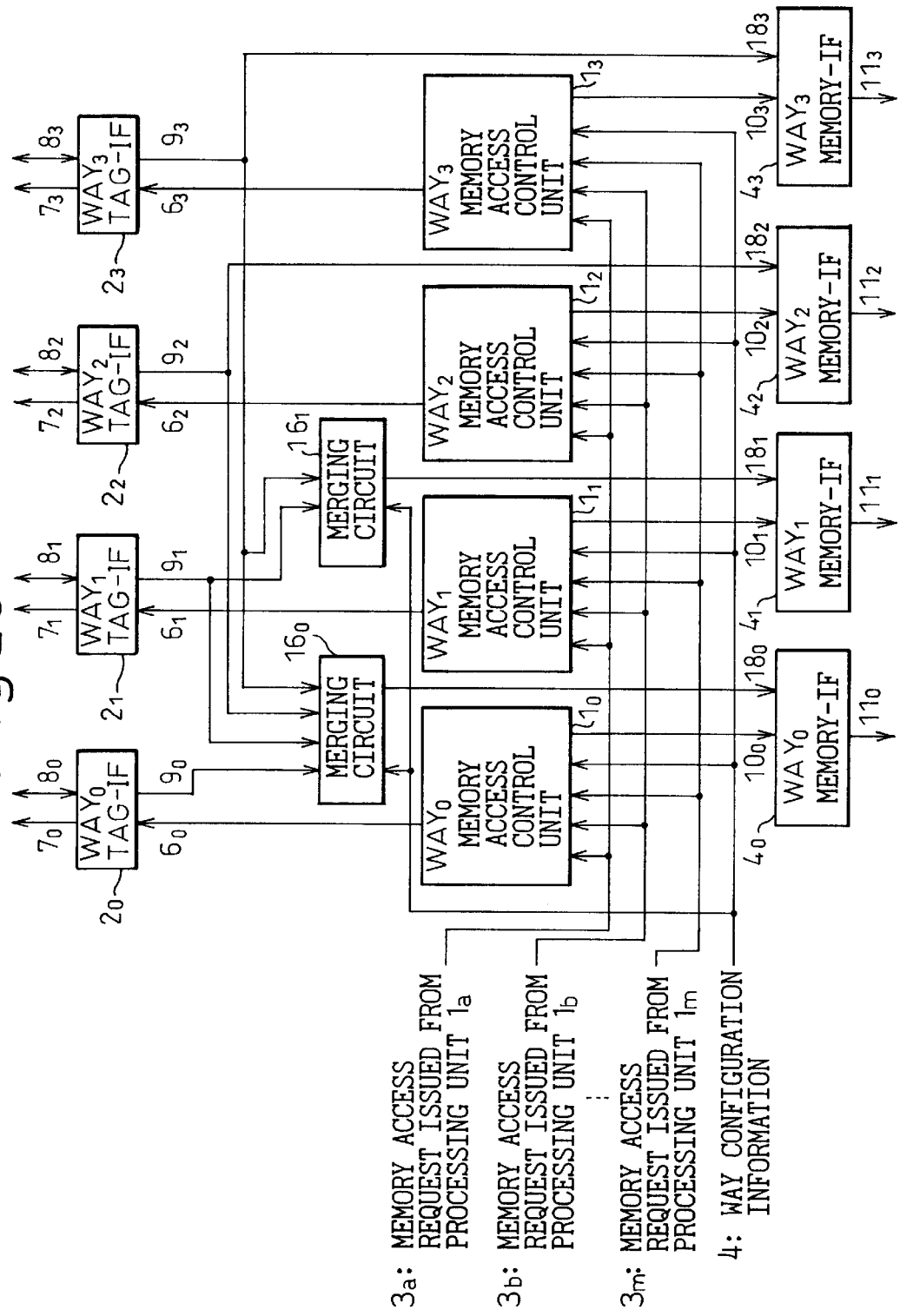

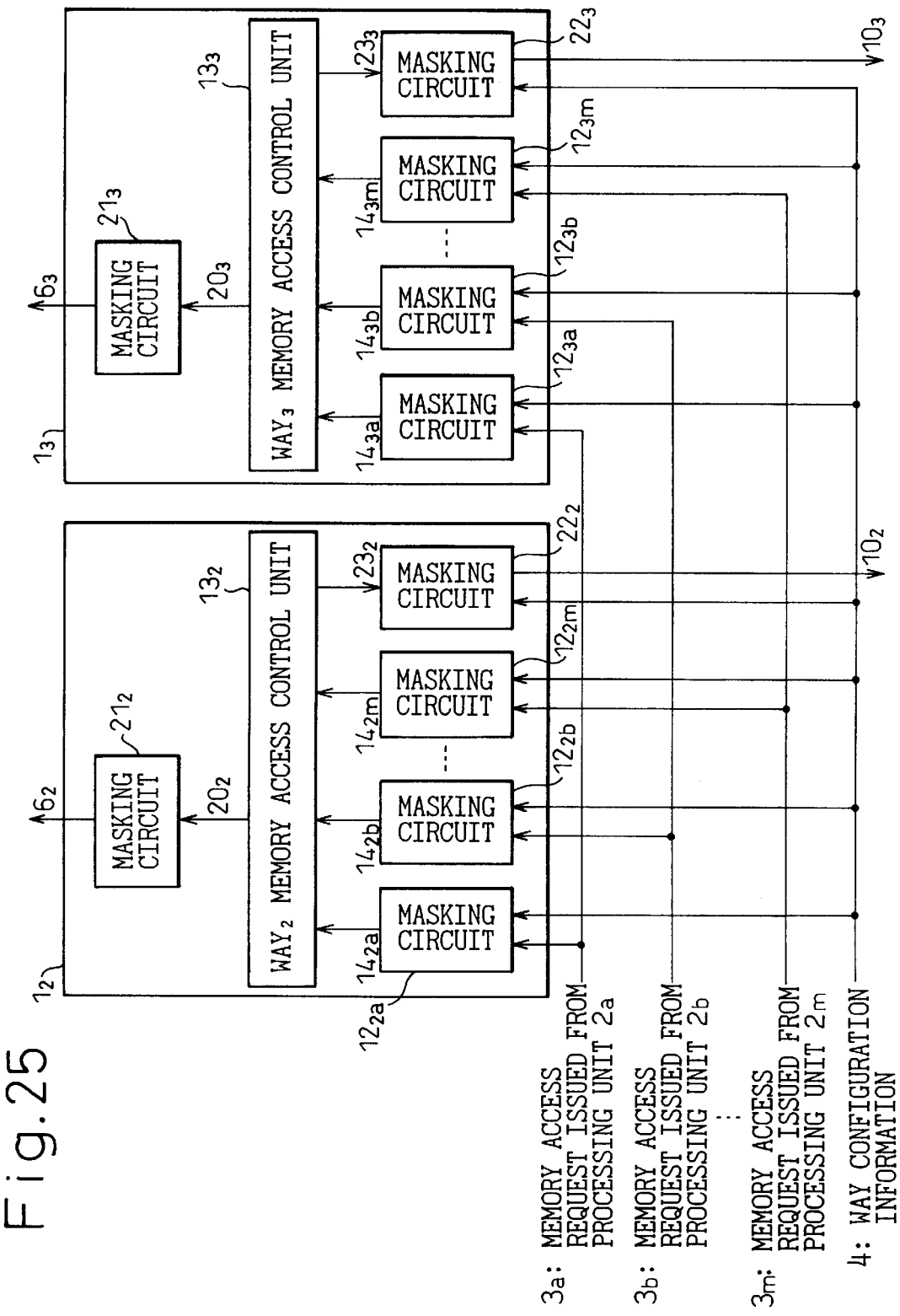

Fig.29A

| a | WAY$_0$ MEMORY ACCESS CONTROL UNIT 1$_0$ | WAY$_1$ MEMORY ACCESS CONTROL UNIT 1$_1$ | WAY$_2$ MEMORY ACCESS CONTROL UNIT 1$_2$ | WAY$_3$ MEMORY ACCESS CONTROL UNIT 1$_3$ |
|----|----|----|----|----|
| 00 | ○  T0  M0 | ○ | ○ | ○ |
| 01 | ○     M0 | ○  T1 | ○ | ○ |
| 10 | ○     M0 | ○ | ○  T2 | ○ |
| 11 | ○     M1 | ○ | ○ | ○  T3 |

Fig.29B

| a | WAY$_0$ MEMORY ACCESS CONTROL UNIT 1$_0$ | WAY$_1$ MEMORY ACCESS CONTROL UNIT 1$_1$ | WAY$_2$ MEMORY ACCESS CONTROL UNIT 1$_2$ | WAY$_3$ MEMORY ACCESS CONTROL UNIT 1$_3$ |
|----|----|----|----|----|
| 00 | ○  T0  M0 | × | ○ | × |
| 01 | × | ○  T1  M1 | × | ○ |
| 10 | ○     M0 | × | ○  T2 | × |
| 11 | × | ○     M1 | × | ○  T3 |

Fig.29C

| a | WAY$_0$ MEMORY ACCESS CONTROL UNIT 1$_0$ | WAY$_1$ MEMORY ACCESS CONTROL UNIT 1$_1$ | WAY$_2$ MEMORY ACCESS CONTROL UNIT 1$_2$ | WAY$_3$ MEMORY ACCESS CONTROL UNIT 1$_3$ |
|----|----|----|----|----|
| 00 | ○  T0  M0 | × | × | × |
| 01 | × | ○  T1  M1 | × | × |
| 10 | × | × | ○  T2  M2 | × |
| 11 | × | × | × | ○  T3  M3 |

○: MEMORY ACCESS CONTROL UNIT IS ACTIVATED.
×: MEMORY ACCESS CONTROL UNIT IS NOT ACTIVATED.
T$_n$: MEMORY ACCESS CONTROL UNIT ACTIVATES TAG INTERFACE ON WAY$_n$.
M$_n$: MEMORY ACCESS CONTROL UNIT ACTIVATES MEMORY INTERFACE ON WAY$_n$.

Fig.32

| Address | 4 WAY | 2 WAY | 1 WAY |
|---|---|---|---|
| FFFFFFC0 | WAY₃ 63 | | |
| FFFFFF80 | WAY₂ 62 | | |
| FFFFFF40 | WAY₁ 61 | | |
| FFFFFF00 | WAY₀ 60 | | |
| ~ | ~ | ~ | ~ |
| 7FFFFFC0 | WAY₃ 63 | WAY₁ 63 | |
| 7FFFFF80 | WAY₂ 62 | WAY₀ 62 | |
| 7FFFFF40 | WAY₁ 61 | WAY₁ 61 | |
| 7FFFFF00 | WAY₀ 60 | WAY₀ 60 | |
| ~ | ~ | ~ | ~ |
| 3FFFFFC0 | WAY₃ 63 | WAY₁ 63 | WAY₀ 63 |
| 3FFFFF80 | WAY₂ 62 | WAY₀ 62 | WAY₀ 62 |
| 3FFFFF40 | WAY₁ 61 | WAY₁ 61 | WAY₀ 61 |
| 3FFFFF00 | WAY₀ 60 | WAY₀ 60 | WAY₀ 60 |
| ~ | ~ | ~ | ~ |
| 000002C0 | WAY₃ 11 | WAY₁ 11 | WAY₀ 11 |
| 00000280 | WAY₂ 10 | WAY₀ 10 | WAY₀ 10 |
| 00000240 | WAY₁ 9 | WAY₁ 9 | WAY₀ 9 |
| 00000200 | WAY₀ 8 | WAY₀ 8 | WAY₀ 8 |
| 000001C0 | WAY₃ 7 | WAY₁ 7 | WAY₀ 7 |
| 00000180 | WAY₂ 6 | WAY₀ 6 | WAY₀ 6 |
| 00000140 | WAY₁ 5 | WAY₁ 5 | WAY₀ 5 |
| 00000100 | WAY₀ 4 | WAY₀ 4 | WAY₀ 4 |
| 000000C0 | WAY₃ 3 | WAY₁ 3 | WAY₀ 3 |
| 00000080 | WAY₂ 2 | WAY₀ 2 | WAY₀ 2 |
| 00000040 | WAY₁ 1 | WAY₁ 1 | WAY₀ 1 |
| 00000000 | WAY₀ 0 | WAY₀ 0 | WAY₀ 0 |

Fig.33A 4WAY
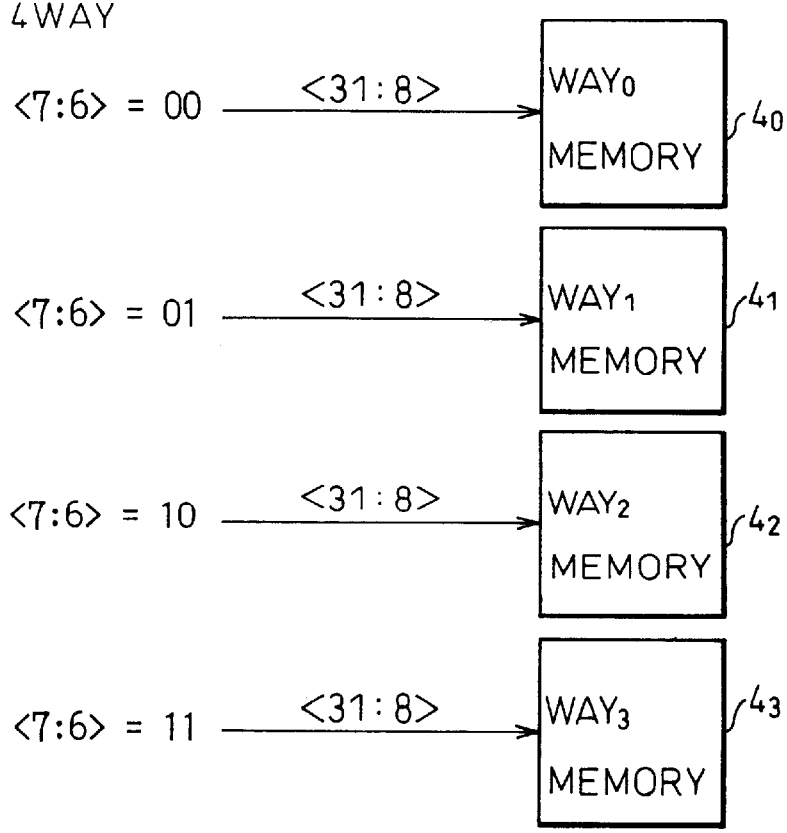
Fig.33B 2WAY
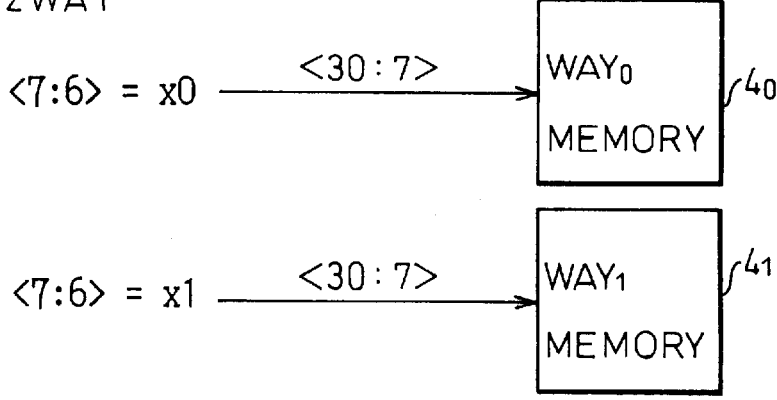
Fig.33C 1WAY
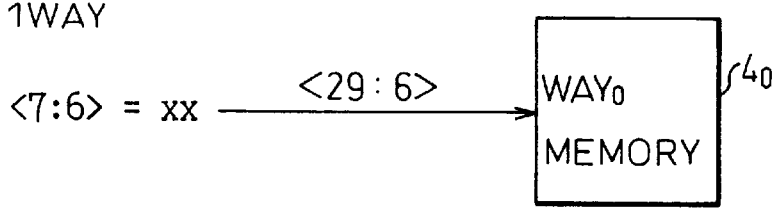

Fig.34
PROCESSING UNIT 2a
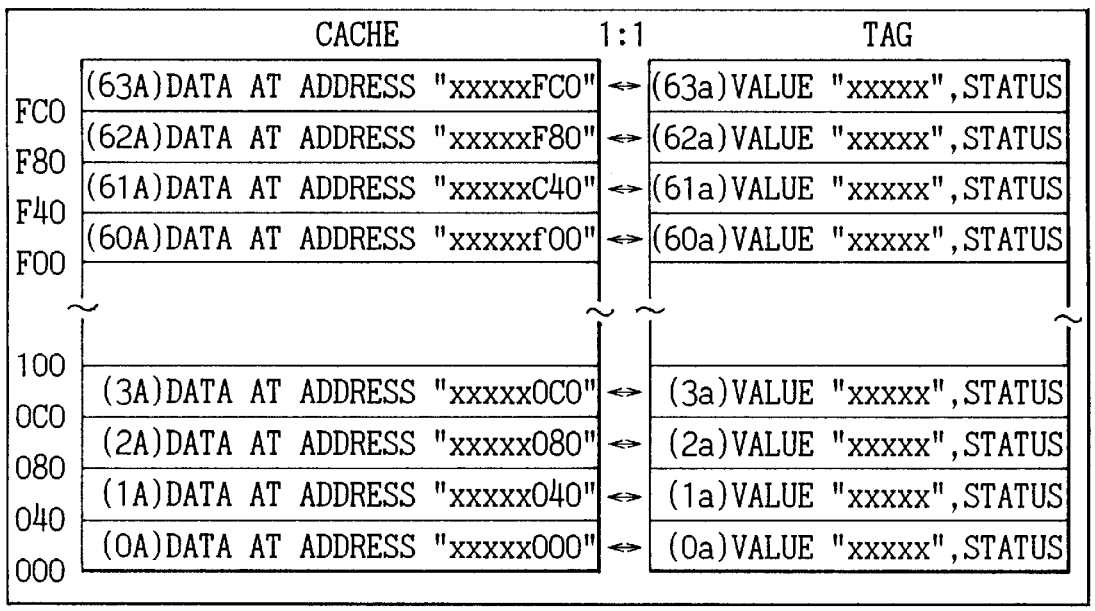
PROCESSING UNIT 2b
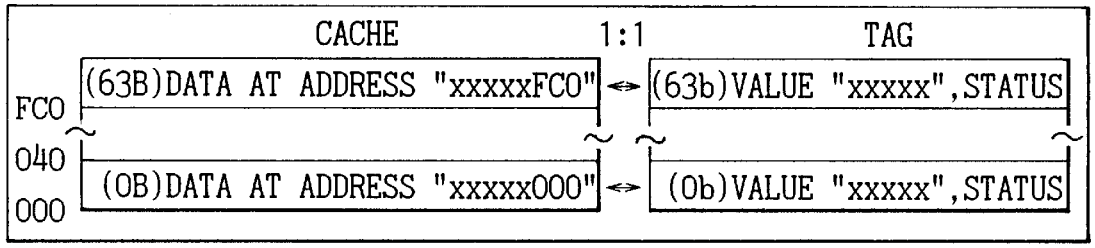
PROCESSING UNIT 2n
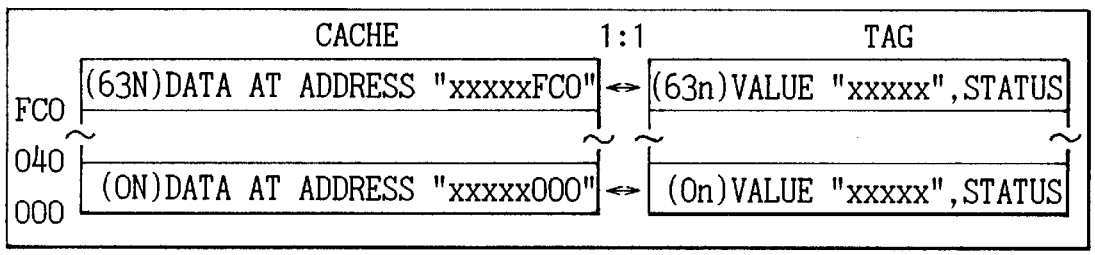

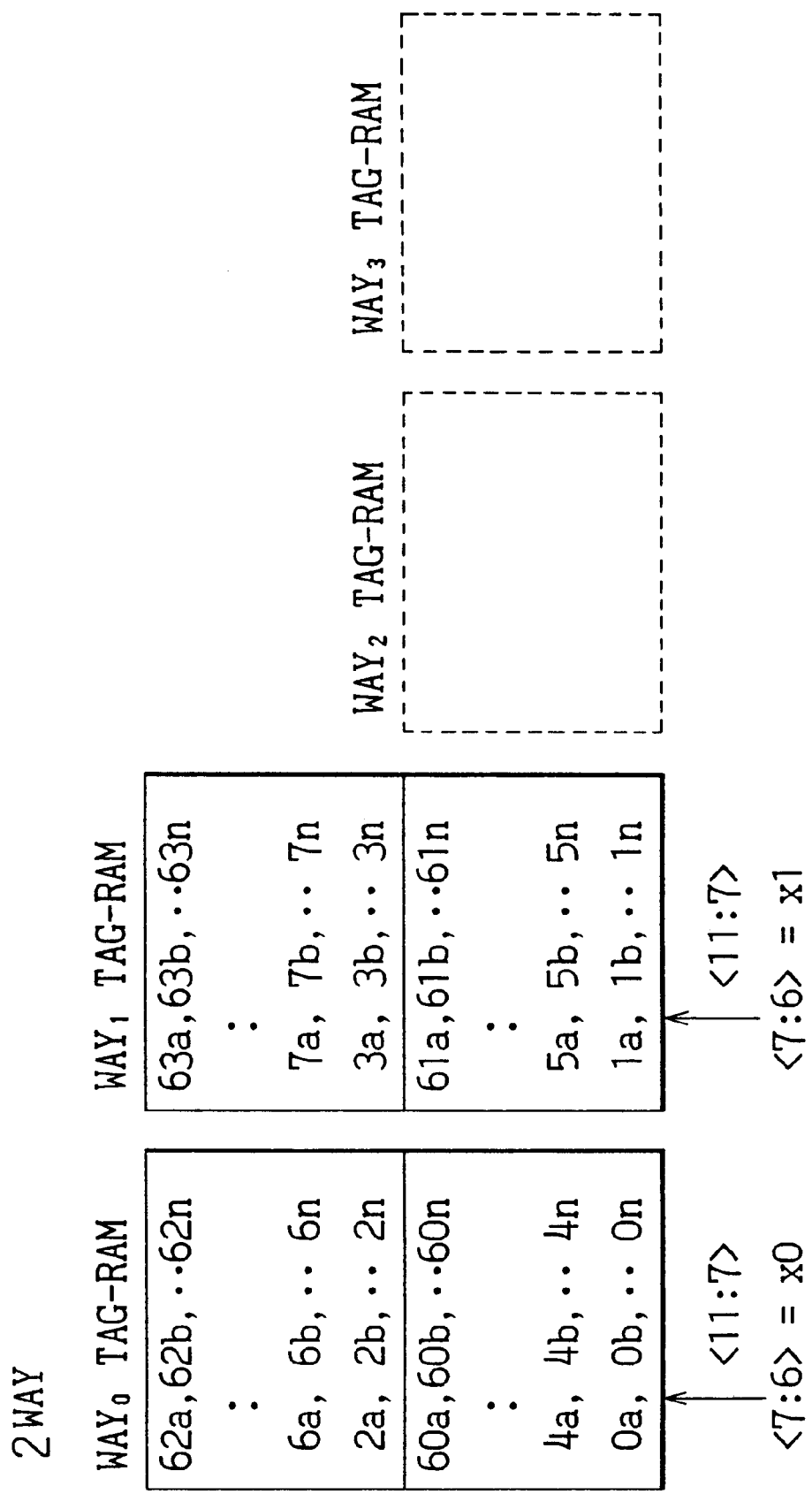

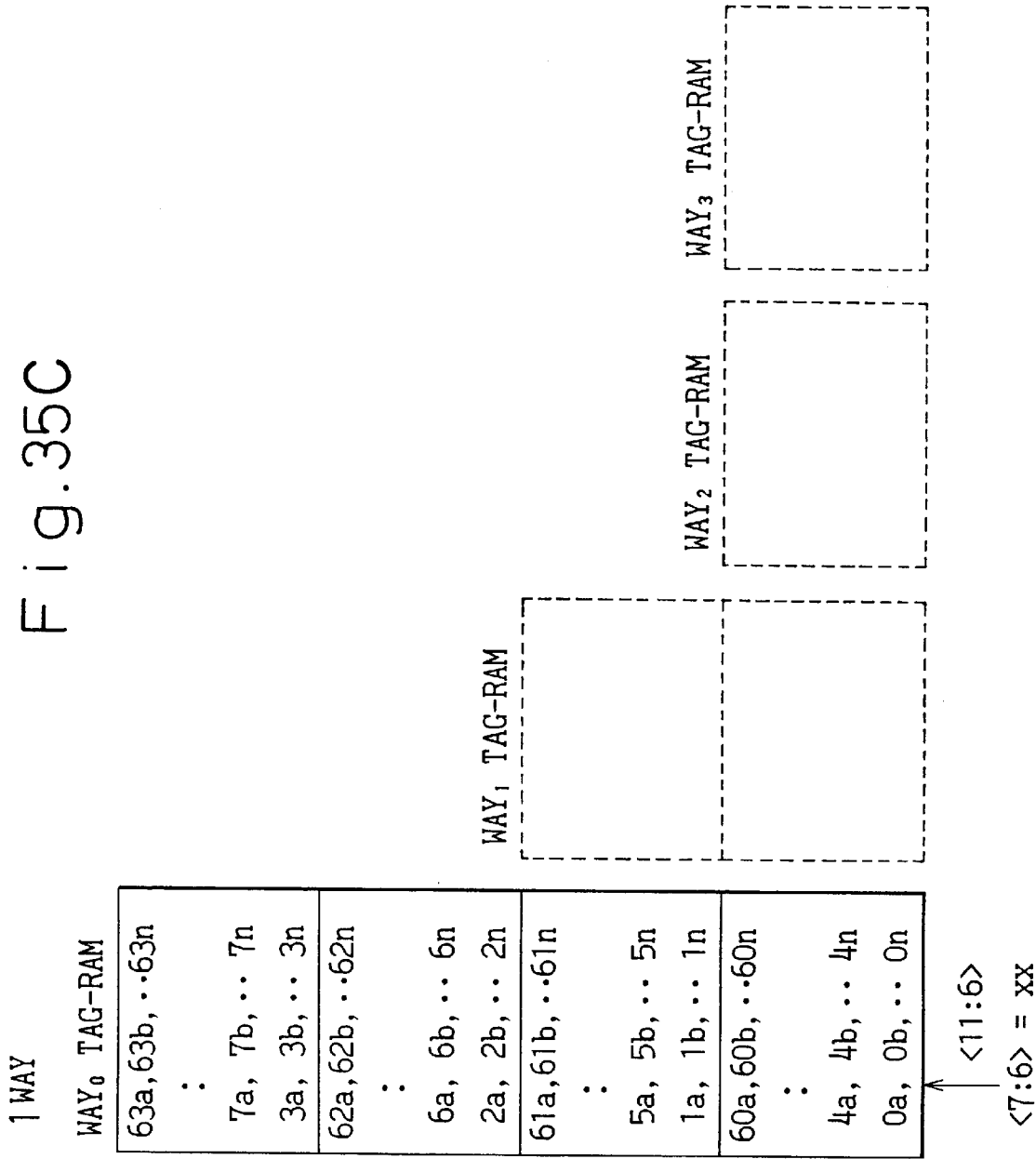

US 6,292,870 B1

INFORMATION PROCESSING SYSTEM IN WHICH MEMORY DEVICES AND COPIES OF TAGS ARE ACCESSED IN RESPONSE TO ACCESS REQUESTS ISSUED FROM PLURALITY OF PROCESSING UNITS

BACKGROUND OF THE INVENTION

1. Field of the Invention

The present invention relates to an information processing system, or more particularly, to an information processing system in which memory devices and copies of tags are accessed in response to access requests issued from a plurality of processing units.

2. Description of the Related Art

In recent years, an art for enabling an information processing system to operate at a high speed using as small a number of logic devices, and as little wiring, as possible has been demanded in conformity with the trend toward a higher density of components and a higher operating speed.

A control sequence for controlling access to memories or memory access in a known information processing system will be described.

The known information processing system comprises a plurality of processing units, memory devices, tag RAMs, and a system controller. Each processing unit has a cache memory and a tag RAM. In the tag RAMs, copies of tags of all the processing units are stored.

When each processing unit accesses a memory, first, the processing unit attempts to index and update the contents of its own tag. If desired data is stored in its own cache memory, the processing unit accesses the cache memory. If the desired data is not stored in its own cache memory, the processing unit issues a memory access request to the system controller. The system controller indexes and updates the copies of tags stored in the tag RAM. If it is found as a result of indexing that the desired data is not stored in any other processing unit, access to memory, or a memory access, is needed. The memory device is therefore activated.

In the known information processing system, as the number of processing units increases, the competition among the processing units for a memory access control unit becomes fierce. Consequently, the efficiency of memory access deteriorates.

SUMMARY OF THE INVENTION

The present invention attempts to solve the above problem. An object of the present invention is to provide an information processing system including a plurality of processing units each having a cache memory while improving the efficiency of access to memories, or memory access, using a simple circuit.

The present invention attempts to accomplish the above object. According to the present invention, there is provided an information processing system in which: processing units having memories and a system controller are interconnected over a bus; the system controller includes access control units for controlling access to copies of tags of the first memories in the processing units and access to memory devices; and thus controls access to memories, or memory access, gained by the processing units. A plurality of memory interfaces are included for making it possible to access the memory devices on an interleaved basis. A term "way" is used for distinguish each of the memory devices on an interleaved basis. Furthermore, the same numbers of copies of tags and memory access control units as the number of the memory interfaces are included for making it possible to access the tags on an interleaved basis.

Since it becomes possible to access memories or tags on an interleaved basis, even if the number of processing units increases, competition for the memory access control units subsides. Consequently, the performance of memory access can be improved.

Moreover, according to the present invention, the memory access control units may each include a means for varying the number of ways permitting interleaving of the second memories. This makes it possible to set the number of memory devices to be mounted in one information processing system to any value.

When the number of ways leading to memories is varied, the number of ways permitting interleaving of tags may be varied or fixed. When the number of ways leading to tags is fixed, even if the memory access control units decrease the number of ways permitting interleaving of the second memories, the memory access control units do not decrease the number of circuits to be operated among all the circuits for enabling access to the tags or tag access.

BRIEF DESCRIPTION OF THE DRAWINGS

The above object and features of the present invention will be more apparent from the following description of the preferred embodiment with reference to the accompanying drawings, wherein:

FIGS. 7A, 7B, 7C and 7D show the configurations of masking circuits shown in FIG. 6;

FIG. 10 shows the configuration of a memory access control unit shown in FIG. 9;

FIGS. 11A, 11B, 11C and 11D show the configurations of masking circuits shown in FIG. 10;

FIG. 12 shows way configuration information shown in FIG. 11;

FIG. 15 shows the configuration of a system controller in the third embodiment of the present invention;

FIGS. 22A, 22B and 22C show the conditions for activation of memory access control units in the third embodiment of the present invention;

FIG. 23 shows the configuration of a system controller in the fourth embodiment of the present invention;

FIG. 25 shows the configurations of memory access control units shown in FIG. 23 (part 2);

FIGS. 29A, 29B and 29C show the conditions for activation of memory access control units in the fourth embodiment of the present invention;

FIG. 32 shows a practical example of the contents of memory devices in accordance with the present invention;

FIGS. 33A, 33B and 33C show the relationships between memory devices and memory addresses in accordance with the present invention;

FIG. 34 shows the relationships between cache memories and tags in accordance with the present invention; and FIGS. 35A, 35B and 35C show practical examples of the contents of tag RAMs in accordance with the present invention.

DESCRIPTION OF THE PREFERRED EMBODIMENTS

Before describing the embodiments of the present invention, the related art and the disadvantage therein will be described with reference to the related figures.

Figure 1:
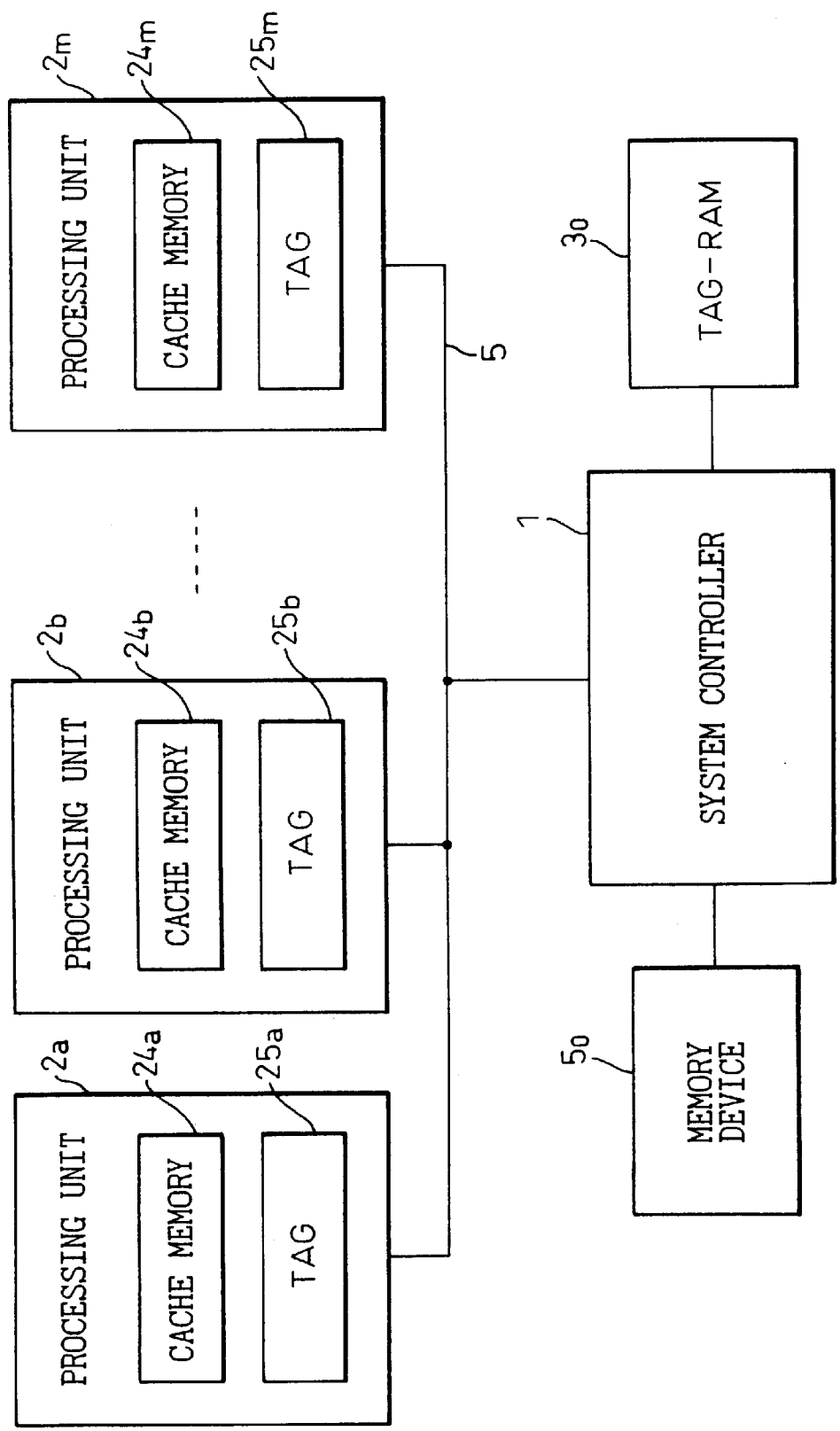
FIG. 1 shows the basic configuration of a known information processing system.

FIG. 1 is a diagram showing the basic configuration of an information processing system including a plurality of processing units each having a cache memory.

In FIG. 1, there are shown a plurality of processing units $2a$ to $2m$, and a system controller 1. The processing units $2a$ to $2m$ and the system controller I are interconnected over a bus 5. The system controller 1 is connected to a memory device 50 and tag RAM 30. The processing units $2a$ to $2m$ include cache memories $24a$ to $24m$ and tags $25a$ to $25m$ respectively. The tag RAM 30 stores copies of the tags $25a$ to $25m$ of the processing units $2a$ to $2m$.

When the processing units $2a$ to $2m$ access memories, first, the processing units index and update their own tags $25a$ to $25m$. If desired data is stored in the own memories $24a$ to $24m$, the processing units access the own memories. By contrast, if the desired data is not stored in the own memories $24a$ to $24m$, the processing units each issue a memory access request to the system controller 1. The system controller 1 indexes and updates the copies of tags stored in the tag RAM 30. If it is found as a result of indexing that the desired data is not stored in the other processing units $2a$ to $2m$, access to memories or memory access is needed. The system controller 1 then activates the memory device 50.

Figure 2:
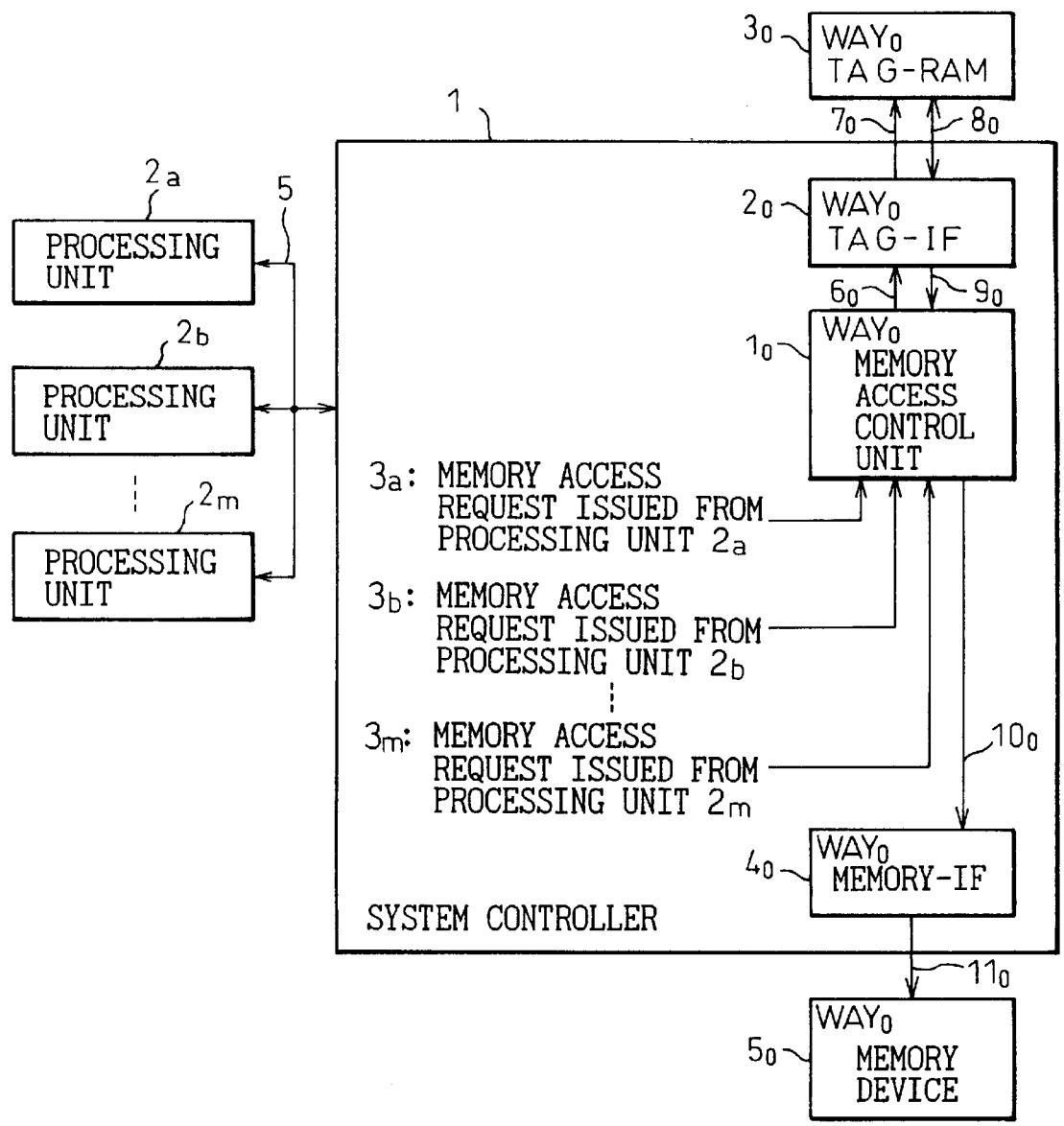
FIG. 2 shows the first example of the configuration of a system controller in the information processing system shown in FIG. 1.
Figure 3:
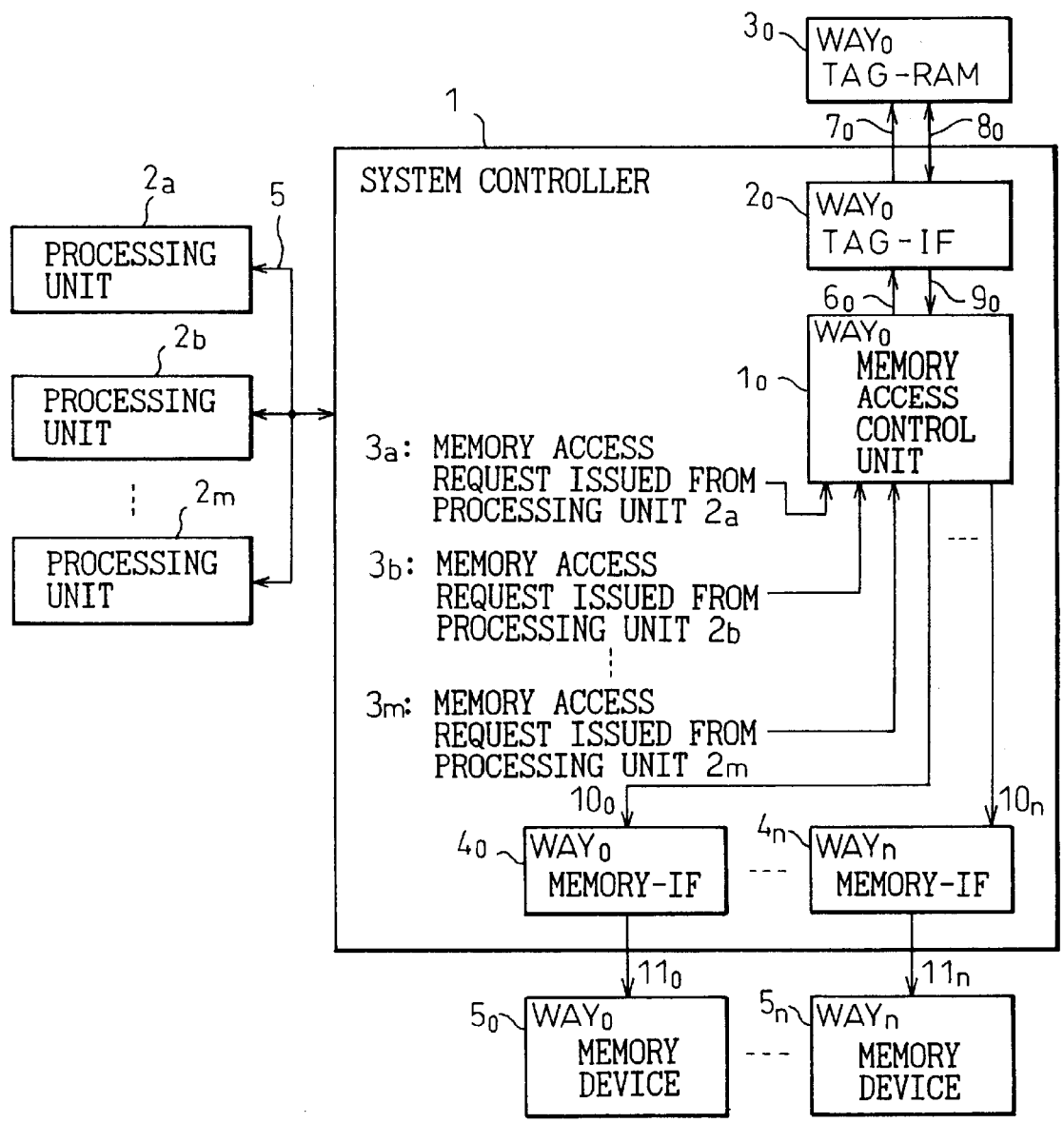
FIG. 3 shows the second example of the configuration of the system controller in the information processing system shown in FIG. 1.

FIGS. 2 and 3 show the configuration of the system controller 1 in the information processing system. In FIG. 2, the number of memory devices is 1, that is, the number of ways leading to memories is 1. In FIG. 3, memory devices are interleaved (the number of interleaved memory devices= n+1) in an effort to speed up memory access.

In FIGS. 2 and 3, there are shown the system controller 1, the plurality of processing units $2a$ to $2m$ each having a cache memory, memory access requests $3a$ to $3m$ issued from the processing units $2a$ to $2m$, a memory access control unit $1_0$, a tag interface $2_0$, a tag RAM $3_0$, memory interfaces $4_0$ to $4_n$, and memory devices $5_0$ to $5_n$.

The system controller 1 and processing units $2a$ to $2m$ are interconnected over the bus 5. The memory access control unit $1_0$ and tag interface $2_0$ are linked by a tag interface activation request line $6_0$ and tag RAM result-of-indexing line $9_0$. The tag interface $2_0$ and tag RAM $3_0$ are linked by a tag RAM control line $7_0$ and tag RAM data line $8_0$.

One memory interface $4_0$ or the plurality of memory interfaces $4_0$ to $4_n$ are linked to the memory access control unit $1_0$ by a memory interface activation request line $10_0$ or memory interface activation request lines $10_0$ to $10_n$. One memory device $5_0$ or the plurality of memory devices $5_0$ to $5_n$ are linked to the memory interface $4_0$ or the memory interfaces $4_0$ to $4_n$ by a memory control line $11_0$ or memory control lines $11_0$ to $11_n$.

The information processing systems shown in FIGS. 2 and 3 control memory access according to a procedure described below. Memory access requests issued from the processing units $2a$ to $2m$ are reported to the system controller 1 over the bus 5, and transferred as the memory access requests $3a$ to $3m$ to the memory access control unit $1_0$ within the system controller 1. The memory access control unit $1_0$ arbitrates the memory access requests $3a$ to $3m$ and handles them one by one.

First, the memory access control unit $1_0$ activates the tag interface $2_0$ over the tag interface activation request line $6_0$. The activated tag interface $2_0$ indexes and updates the contents of the tag RAM $3_0$ over the tag RAM control line $7_0$ and tag RAM data line $8_0$. The result of indexing is reported to the memory access control unit $1_0$ over the tag RAM result-ofindexing line $9_0$.

If it is judged from the result of indexing sent over the tag RAM result-of-indexing line $9_0$ that memory access is needed, the memory access control unit to activates the memory interfaces $4_0$ to $4_n$, over the memory interface activation request lines $10_0$ to $10_n$. The memory interfaces $4_0$ to $4_n$ activate the memory devices $5_0$ to $5_n$ over the memory control lines $11_0$ to $11_n$.

Embodiments of the present invention will be described in conjunction with the drawings. In the subsequent description, the same reference numerals will be assigned to components having the same functions. Duplicate descriptions will be omitted.

(First Embodiment)

Figure 4:
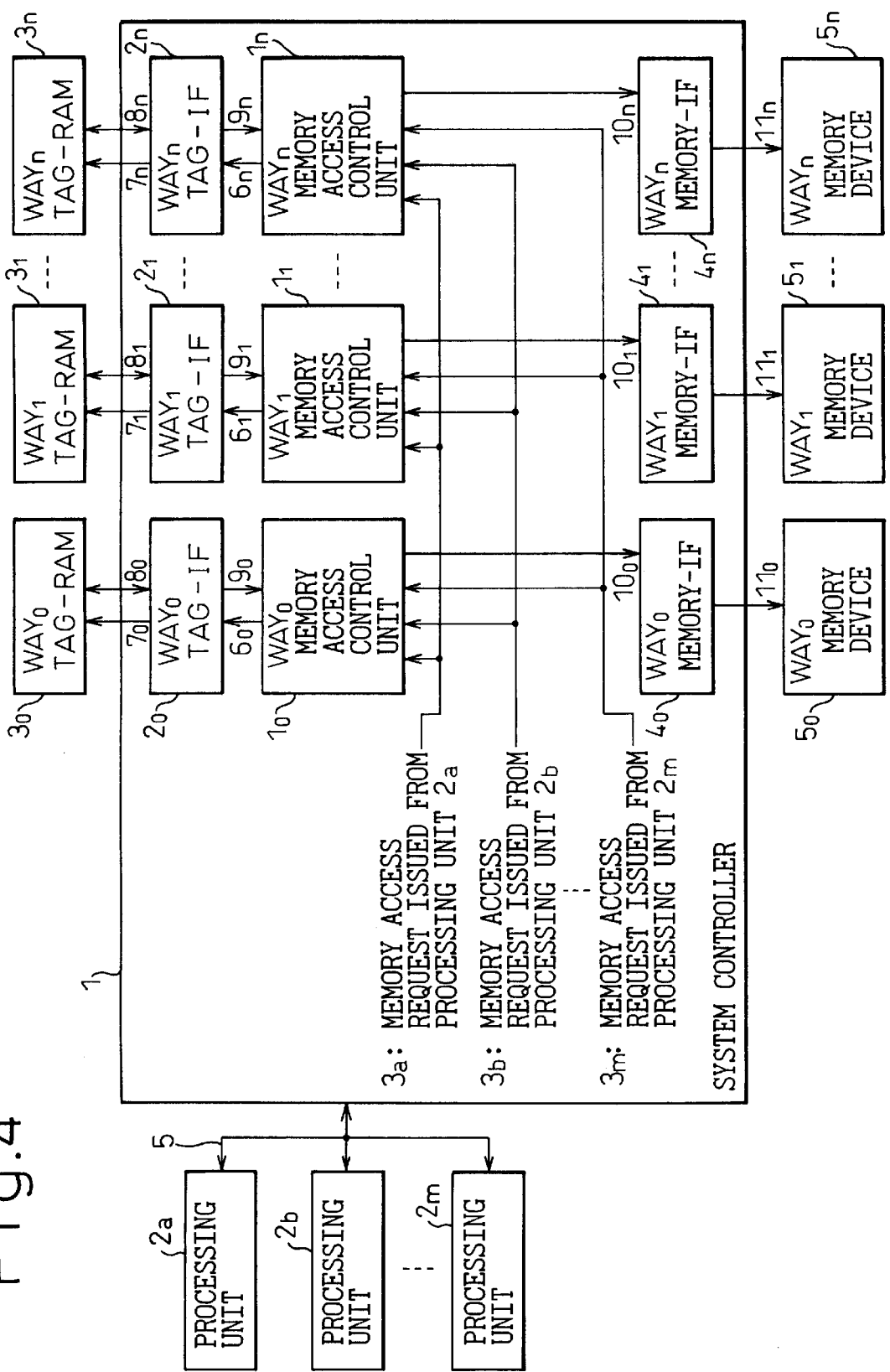
FIG. 4 shows the configuration of a system in accordance with the first embodiment of the present invention.

FIG. 4 is a diagram of a system configuration in accordance with the first embodiment of the present invention.

In FIG. 4, there are shown a system controller 1, a plurality of processing units $2a$ to $2m$ each having a cache memory, and memory access requests $3a$ to $3m$ issued from the processing units $2a$ to $2m$.

In the subsequent description, $WAY_0$ to $WAY_n$ denote ways permitting interleaving of memories. In the system shown in FIG. 4, the number of ways is n+1. Along the ways $WAY_0$ to $WAY_n$, memory access control units 1, tag interfaces $2_0$ to $2_n$, tag RAMs $3_0$ to $3_n$, memory interfaces $4_0$ to $4_n$, and memory devices $5_0$ to $5_n$ are installed.

Figure 5:
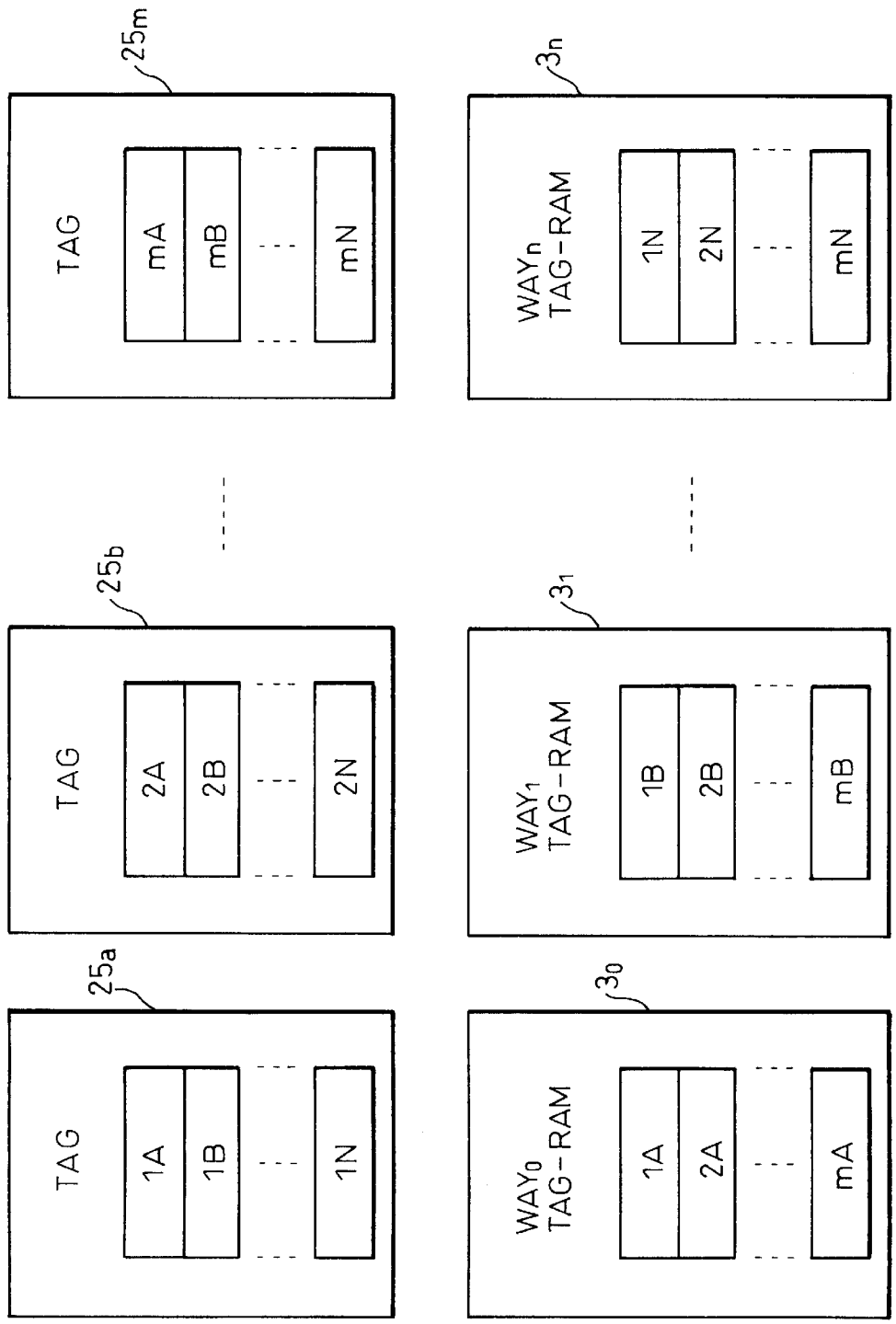
FIG. 5 shows the relationship between tags of processing units and tag RAMs shown in FIG. 4.

FIG. 5 shows the relationships between the tags of the processing units $2a$ to $2m$ and the tag RAMs $3_0$ to $3_n$. The tags $25a$ to $25m$ of the processing units $2a$ to $2m$ are each divided into the same number of portions A to N as the number of ways, n. The copies of the portions are interleaved in the tag RAMs $3_0$ to $3_n$.

Referring back to FIG. 4, the system controller 1 and processing units $2a$ to $2m$ are interconnected over a bus 5. The memory access control units $1_0$ to $1_n$ and tag interfaces $2_0$ to $2_n$ are linked by tag interface activation request lines $6_0$ to $6_n$ and tag RAM result-of-indexing lines $9_0$ to $9_n$. The tag interfaces $2_0$ to $2_n$ and tag RAMs $3_0$ to $3_n$ are linked by tag RAM control lines $7_0$ to $7_n$ and tag RAM data lines $8_0$ to $8_n$.

Moreover, the memory interfaces $4_0$ to $4_n$ are linked to the memory access control units $1_0$ to $1_n$ by memory interface activation request lines $10_0$ to $10_n$. The memory devices $5_0$ to $5_n$ are linked to the memory interfaces $4_0$ to $4_n$. The memory access requests $3a$ to $3m$, and signals sent over the tag interface activation request lines $6_0$ to $6_n$ and memory interface activation request lines $10_0$ to $10_n$ each contain added information such as an address and access type.

The information processing system shown in FIG. 4 controls memory access according to the procedure described below.

When the processing units $2a$ to $2m$ access memories, first, they index and update the contents of their own tags $25a$ to $25m$. If desired data is stored in their own cache memories, the processing units access the cache memories. By contrast, if the desired data is not stored in the memories $24a$ to $24m$, the processing units each issue a memory access request to the system controller 1.

The memory access requests issued from the processing units $2a$ to $2m$ are reported to the system controller 1 over the bus 5, and transferred as the memory access requests $3a$ to $3m$ to the memory access control units $1_0$ to $1_n$ within the system controller 1. The memory access requests $3a$ to $3m$ are input to the associated memory access control units $1_0$ to $1_n$ by masking circuits included in the memory access control units $1_0$ to $1_n$. The masking circuits will be described later.

When the memory access requests $3a$ to $3m$ compete for a memory access control unit, each of the memory access control units $1_0$ to $1_n$ arbitrates and processes the memory access requests one by one. The arbitration technique is already known. A description of the arbitration technique will therefore be omitted.

The memory access control units $1_0$ to $1_n$ activate the tag interfaces $2_0$ to $2_n$ in response to requests sent over the tag interface activation request lines $6_0$ to $6_n$. The activated tag interfaces $2_0$ to $2_n$ index and update the contents of the tag RAMs $3_0$ to $3_n$ over the tag RAM control lines $7_0$ to $7_n$ and tag RAM data lines $8_0$ to $8_n$. The results of indexing are reported to the memory access control units $1_0$ to $1_n$ over the tag RAM result-of-indexing lines $9_0$ to $9_n$.

If it is judged from the results of indexing sent over the tag RAM result-of-indexing lines $9_0$ to $9_n$ that desired data is not stored, memory access is needed. In this case, the memory access control units $1_0$ to $1_n$ activate the memory interfaces $4_0$ to $4_n$ in response to the results of indexing sent over the memory interface activation request lines $10_0$ to $10_n$. The memory interfaces $4_0$ to $4_n$ activate the memory devices $5_0$ to $5_n$ over the memory control lines $11_0$ to $11_n$.

As described above, the memory access control units $1_0$ to $1_n$, tag interfaces $2_0$ to $2_n$, and tag RAMs $3_0$ to $3_n$ are included in one-to-one correspondence with the ways leading to the memories. The memory access requests $3a$ to $3m$ routed along different ways will be processed without competing with one another. This is enabled by the incorporation of the masking circuits $12_{na}$ to $12_m$ in the memory access control units $1_0$ to $1_n$.

The masking circuits will be described in conjunction with FIGS. 6 and 7. The masking circuits are associated with the memory access requests $3a$ to $3m$ and are included in each of the memory access control units $1_0$ to $1_n$. The masking circuits incorporated in the memory access control unit to are masking circuits $12_{0a}$ to $12_{0m}$.

The masking circuits incorporated in the memory access control unit $1_n$ are masking circuits $12_{na}$ to $12_{nm}$. All the masking circuits are therefore masking circuits $12_{na}$ to $12_{nm}$.

Figure 6:
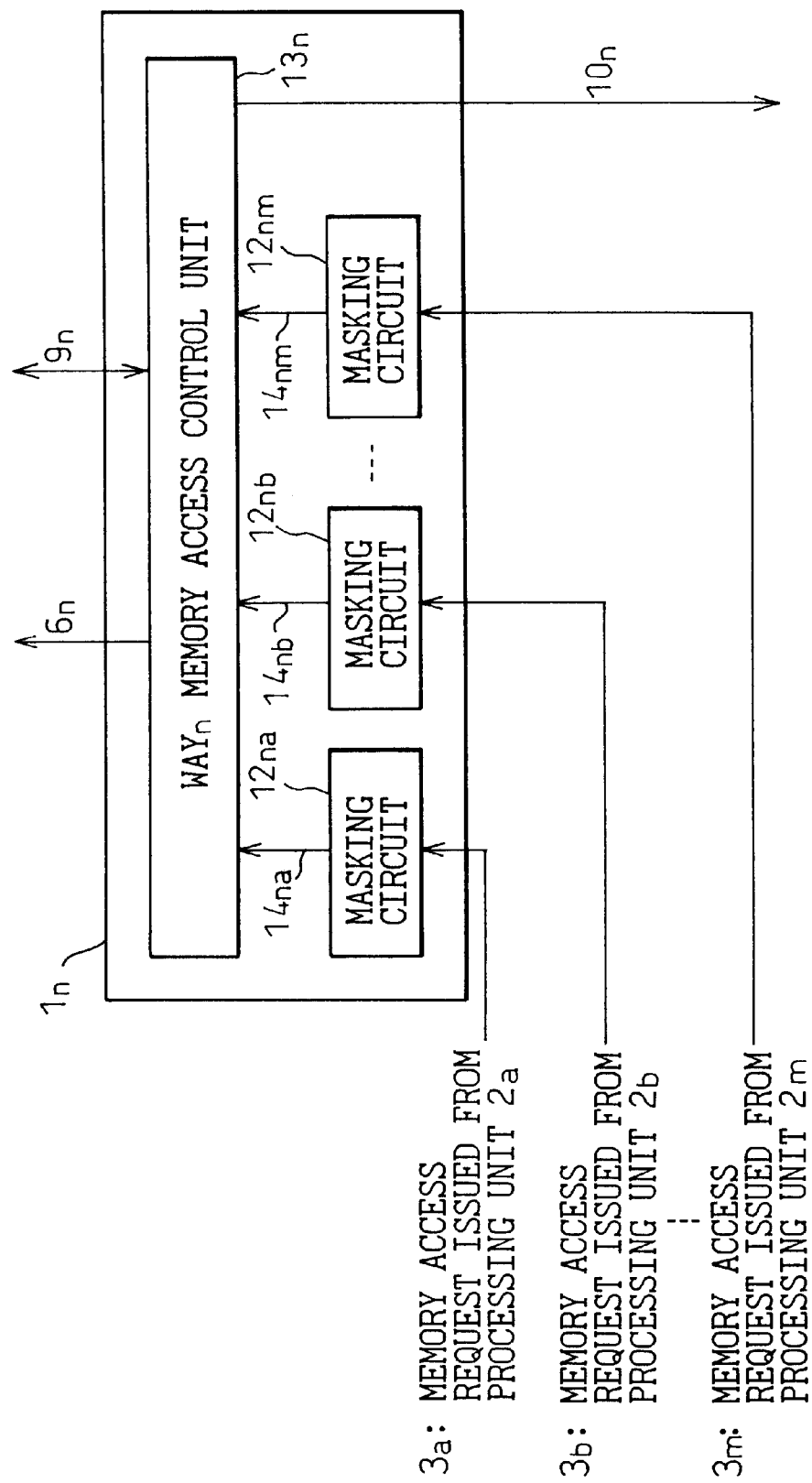
FIG. 6 shows the configuration of a memory access control unit shown in FIG. 1.

FIG. 6 shows the configuration of one memory access control unit 1. The memory access requests $3a$ to $3m$ issued from the processing units $2a$ to $2m$ are input to the masking circuits $12_{0a}$ to $12_{nm}$. Requests that are not masked by the masking circuits are input as memory access requests $14_{0a}$ to $14_{nm}$ to memory access control circuits $13_0$ to $13_n$.

FIGS. 7A, 7B, 7C and 7D show the practical configurations of masking circuits. Herein, assume that the number of ways leading to the memories is four and the address of a memory determining a way is specified as a <7:6>. Shown are the last masking circuits $12_{0m}$ to $14_{4m}$ in the memory access control units $1_0$ to $1_4$. The last memory access request $3m$ is therefore input to the masking circuits $12_{0m}$ to $14_{4M}$.

FIG. 7A shows the configuration of the masking circuit $12_{0M}$ on the way $WAY_0$. FIG. 7B shows the configuration of the masking circuit $12_{1m}$ on the way $WAY_1$. FIG. 7C shows the configuration of the masking circuit $12_{2m}$ on the way way2. FIG. 7D shows the configuration of the masking circuit $12_{3m}$ on the way $WAY_3$. The masking circuits $12_{0m}$ to $12_{4m}$ gate the memory access request relative to the memory address at <7:6>.

Herein, assume that an access request for a memory having an address a <7:6>=10 is issued from the processing unit $2m$ on the way $WAY_m$ shown in FIG. 4. The access request is reported as a memory access request $3m$ to all the memory access control units $1_0$ to $1_3$. The access requests $3m$ in the memory access control units $1_0$, $1_1$ and $1_3$ are masked by the masking circuit $12_0$, $12_1$, and $12_3$. As a result, a memory access request $14_{2m}$ is output only from the masking circuit $12_2$. Consequently, the memory access control unit $1_2$ alone is activated.

The foregoing operations will be described in conjunction with FIG. 8.

The memory access control units $1_0$ to $1_n$ judge whether or not the masking circuits $12_{0a}$ to $12_{nm}$ should mask access requests (step SI). Requests intended to be placed on ways other than accessible ways are masked (step S2).

If a plurality of access requests are present, each of the memory access control circuits $13_0$ to $13_n$ arbitrates the requests. As for requests not masked at step S2, it is judged whether arbitration among the requests by the memory access control circuits $13_0$ to $13_n$ has succeeded (step S3). When arbitration among the requests has succeeded, an activation request for an associated tag interface is produced (step S4).

The tag interfaces $2_0$ to $2_n$ index and update the contents of the tags (step S5), and transmit the results of indexing (step S6).

The memory access control circuits $13_0$ to $13_n$ wait for the completion of the indexing of the contents of the tags (step S7). When the indexing is completed, it is judged whether or not memory access is needed (step S8). If memory access is needed, an activation request for an associated memory interface is produced and transmitted (step S9). The memory interfaces $4_0$ to $4_n$ activate the memory devices $5_0$ to $5_n$ (step S10). If it is judged at step S8 that memory access is not needed, another sequencer is activated (step S11).

(Second Embodiment)

In the aforesaid first embodiment, the number of ways leading to the memories within one system controller is fixed. A set number of memories alone can be connected to one unit. By contrast, the second embodiment makes it possible to provide a model in which the same system controller has a decreased number of ways leading to the memories.

Figure 9:
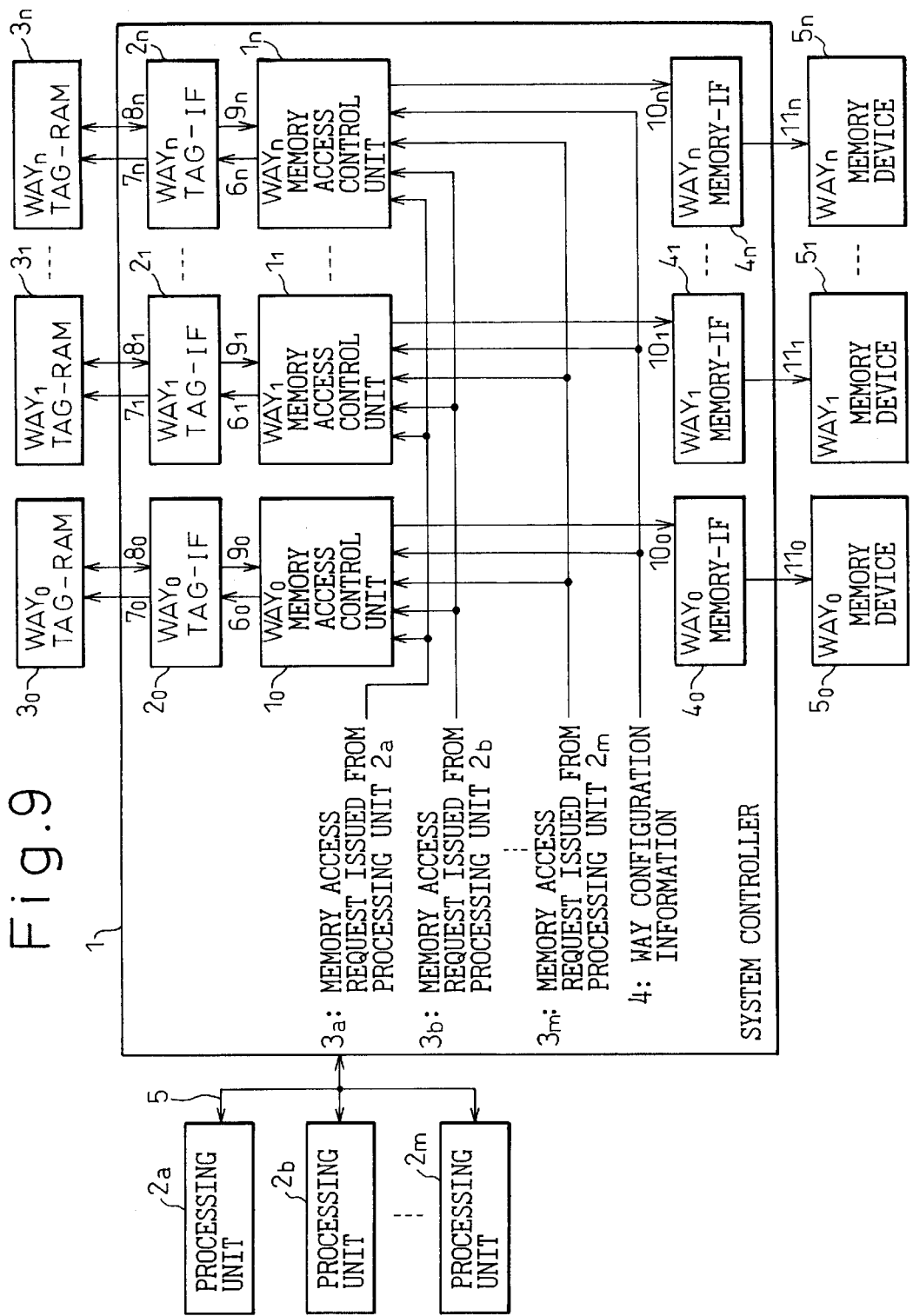
FIG. 9 shows the configuration of a system in accordance with the second embodiment of the present invention.

FIG. 9 shows a system configuration in accordance with the second embodiment of the present invention, FIG. 10 shows the configuration of a memory access control unit, and FIGS. 11a to 11d show the configurations of masking circuits.

FIGS. 9, 10 and 11 show the same circuitries as those shown in the drawings relevant to the aforesaid first embodiment. Specifically, FIG. 9 corresponds to FIG. 4, FIG. 10 corresponds to FIG. 6, and FIGS. 11A, 11B, 11C and 11D correspond to FIGS. 7A, 7B, 7C and 7D. In the subsequent description, a constituent feature specific to the second embodiment will be described mainly. A duplicate description will be briefed.

The system configuration shown in FIG. 9 is different from the one of the first embodiment shown in FIG. 4 in a point that way configuration information 4 is input to the memory access control units $1_0$ to $1_n$ in addition to the memory access requests $3a$ to $3m$. The other components are identical to those shown in FIG. 4. A duplicate description will be omitted. The way configuration information 4 specifies the number of ways leading to the memories. The output source of the way configuration information may be an output value of a register or a value obtained by calculating external pin contacts.

The memory access control units $1_0$ to $1_n$ shown in FIG. 10 are different from those shown in FIG. 6 according to the first embodiment in a point that the way configuration information 4 is input to the masking circuits $12_{0a}$ to $12_{nm}$ in addition to the memory access requests $3a$ to $3m$. The other components are identical to those shown in FIG. 4. A duplicate description will be omitted.

FIGS. 11A, 11B, 11C and 1D show practical examples of masking circuits. Assume that the number of ways leading to the memories is four and the address of a memory determining a way is specified as a <7:6>. A certain memory access request $3m$ is input to the last masking circuits $12_{0m}$ to $12_{4m}$ in the memory access control units $1_0$ to $1_4$.

FIG. 11a shows the configuration of the masking circuit $12_{0m}$ on the way $WAY_0$, FIG. 11B shows the configuration of the masking circuit $12_{2m}$ on the way $WAY_2$, FIG. 11C shows the configuration of the masking circuit $12_{2m}$ on the way $WAY_2$, and FIG. 11D shows the configuration of the masking circuit $12_3 m$. on the way $WAY_3$.

The masking circuits $12_{0m}$ to $12_{4m}$ each has a gate. A condition for masking under which each gate operates is the AND of the address a<7:6> and way configuration information 4. This enables a decrease in number of ways for reducing the size of the system. An example of the way configuration information is shown in FIG. 12.

In FIG. 11A, for gating the memory access request $3m$, way configuration information 00 and a memory address a<7:6>=xx (wherein x denotes any numeral) are ANDed, way configuration information 01 and a memory address a=x0 are ANDed, and way configuration information 10 and a memory address a=00 are ANDed. The OR of the ANDS and the memory access request $3m$ are then ANDed. A signal passed by the AND gate is output as a memory access request $14_{0m}$ to the memory access control unit $1_0$.

In FIG. 11B, for gating the memory access request $3m$, way configuration information 01 and a memory address a=x0 are ANDed and way configuration information 10 and a memory address a=01 are ANDed. The OR of the ANDS and the memory access request $3m$ are then ANDed. A signal passed by the gate is output as a memory access request $14_{1m}$ to the memory access control unit $1_1$.

In FIG. 11C, for gating the memory access request $3m$, way configuration information 10 and a memory address a=10 are ANDed, and the AND and memory access request $3m$ are then ANDed. A signal passed by the gate is output as a memory access request $14_{2m}$ to the memory access control unit $1_2$. In FIG. 11D, for gating the memory access request $3m$, way configuration information 10 and a memory address a=11 are ANDed, and the AND and memory access request $3m$ are then ANDed. A signal passed by the gate is output as a memory access request $14_{3m}$ to the memory access control unit $1_3$.

When 1 is designated as the number of ways (00 is specified for way <1:0>), the condition for masking set in only the masking circuit $12_{0m}$ on the way $WAY_0$ is met. When 2 is designated as the number of ways (01 is specified for way<1:0>), the conditions for masking set in the masking circuit $12_{0m}$ on the way $WAY_0$ shown in FIG. 11A and the masking circuit $12_{1m}$ on the way $WAY_1$ shown in FIG. 11B are met. When 4 is designated as the number of ways (10 is specified for way<1:0>), the conditions for masking set in all the circuits shown in FIGS. 11A, 11B, 11C and 11D are met.

When a configuration including one way is designated, the first memory access control unit $1_0$ alone is enabled to operate with the memory access request $14_{0m}$. When a configuration including two ways is designated, the first and second memory access control units $1_0$ and $1_1$ are enabled to operate. When a configuration including four ways is designated, all the memory access control units $1_1$ to $1_n$ are enabled to operate, and the same operations as those in the first embodiment are carried out.

If the number of ways leading to the memories is halved or quartered for reducing the size of the system, the number of ways leading to the tag RAMs is also halved or quartered. However, since the number of the cache memories in the processing units $2a$ to $2m$ is not decreased, rearrangement of the tag RAMs becomes necessary.

Figure 13A:
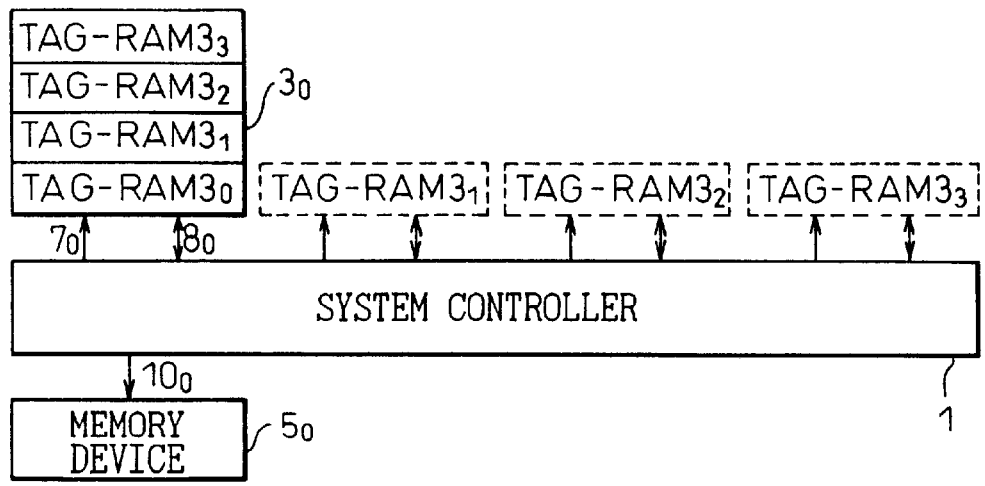
FIGS. 13A, 13B and 13C show examples of arrangements of tag RAMs dependent on the number of ways in the second embodiment of the present invention.
Figure 13B:
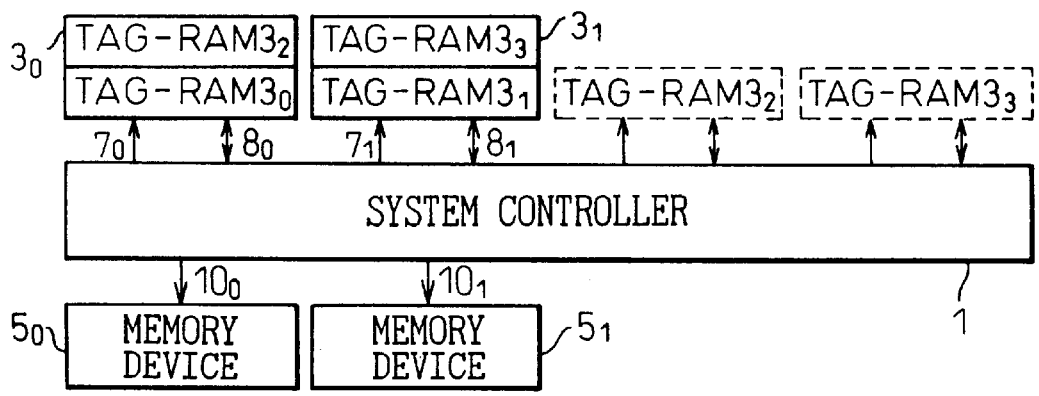
Figure 13C:
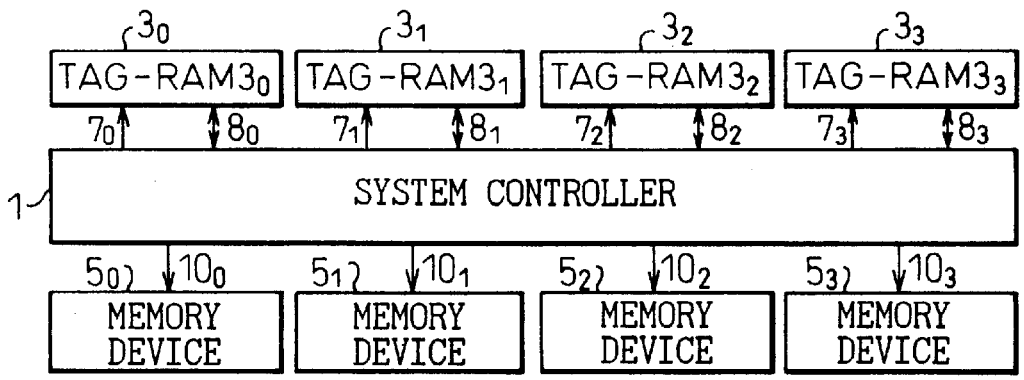

FIGS. 13A, 13B and 13C show rearranged states of the tag RAMs. FIG. 13A shows a rearranged state for a configuration including one way. In this configuration, one tag RAM 30 is mounted along the way $WAY_0$. The contents of all the tag RAMs $3_0$ to $3_3$ shown in FIG. 9 are stored in the tag RAM $3_0$. FIG. 13B shows a rearranged state for a configuration including two ways. In this configuration, the tag RAM $3_0$ and tag RAM $3_1$ are mounted along the ways $WAY_0$ and $WAY_1$. The contents of the tag RAMs $3_0$ and $3_2$ shown in FIG. 9 are stored in the tag RAM $3_0$, and the contents of the tag RAMs $3_1$ and $3_3$ are stored in the tag RAM $3_1$. FIG. 13C shows a rearranged state for a configuration including four ways. The tag RAMs $3_0$ to $3_3$ are mounted along the ways $WAY_0$ to $WAY_3$, whereby the same configuration as that in the first embodiment is realized.

The operations in the foregoing second embodiment are nearly the same as those in the first embodiment except that the numbers of memory access control units, tag RAMs, and memory devices to be operated actually are different. A duplicate description of the operations will be omitted.

(Third Embodiment)

Figure 14A:
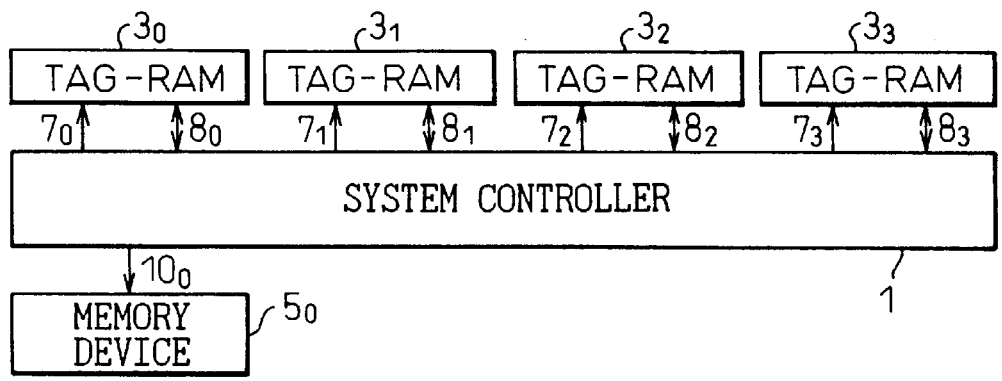
FIGS. 14A, 14B and 14C show examples of arrangements of tag RAMs dependent on the number of ways in the third embodiment of the present invention.
Figure 14B:
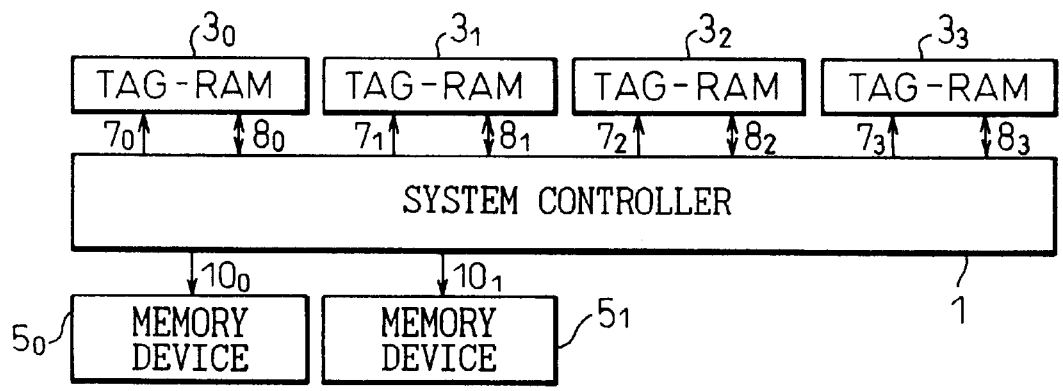
Figure 14C:
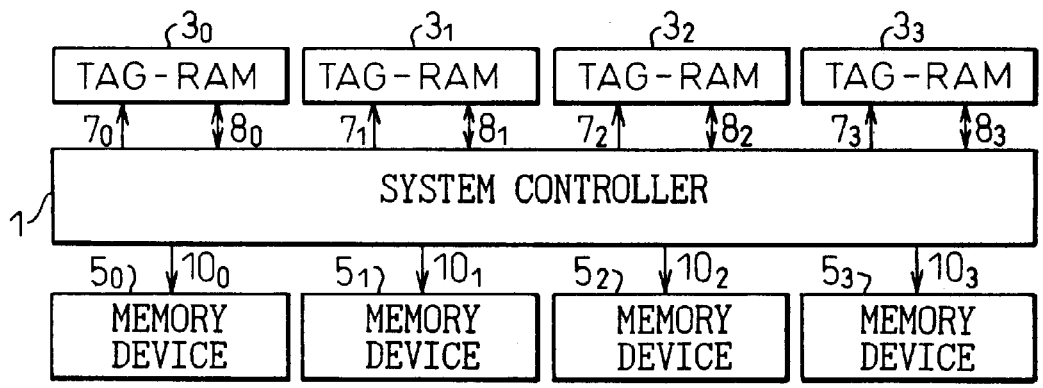

In the second embodiment, the number of ways leading to the tag RAMs is also decreased with a decrease in number of ways leading to the memories. Tag RAMs must therefore be, as shown in FIGS. 13A, 13B and 13C, rearranged according to a decrease in number of memories. In contrast, in the third embodiment, even when the number of ways leading to the memories is decreased, tag RAMs need not be rearranged. This will be described in conjunction with FIGS. 14A, 14B, 14C and 14D. That is to say, when the number of ways leading to the memory devices $5_0$ to $5_n$ is changed to one as shown in FIG. 14A, two as shown in FIG. 14B, or four as shown in FIG. 14C, the tag RAMs $3_0$ to $3_n$ need not be rearranged.

In the description of the third embodiment, the number of ways shall be four. However, the maximum number of ways is not limited to four but may be the n-th power of 2. Moreover, a decrease in number of tag RAMs to the n-th power of 2 should be supported, but it is unnecessary to support a decrease in number of tag RAMs to every value.

FIG. 15 shows the configuration of a system controller. In the system controller shown in FIG. 15, as in the one shown in FIG. 9 according to the second embodiment, the way configuration information 4 as well as the memory access requests $3a$ to $3m$ are input to the memory access control units $1_0$ to $1_3$. Moreover, the tag interface activation requests $6_0$ to $6_3$ sent from the memory access control units $1_0$ to $1_3$ are output in the same manner as those shown in FIG. 9 according to the second embodiment. However, in FIG. 15, merging circuits $15_1$ to $15_3$ for merging activation requests and merging circuits $16_0$ to $16_1$ for merging results of indexing are inserted between the memory access control units $1_0$ to $1_3$ and tag interfaces $2_0$ to $2_3$.

Figure 16:
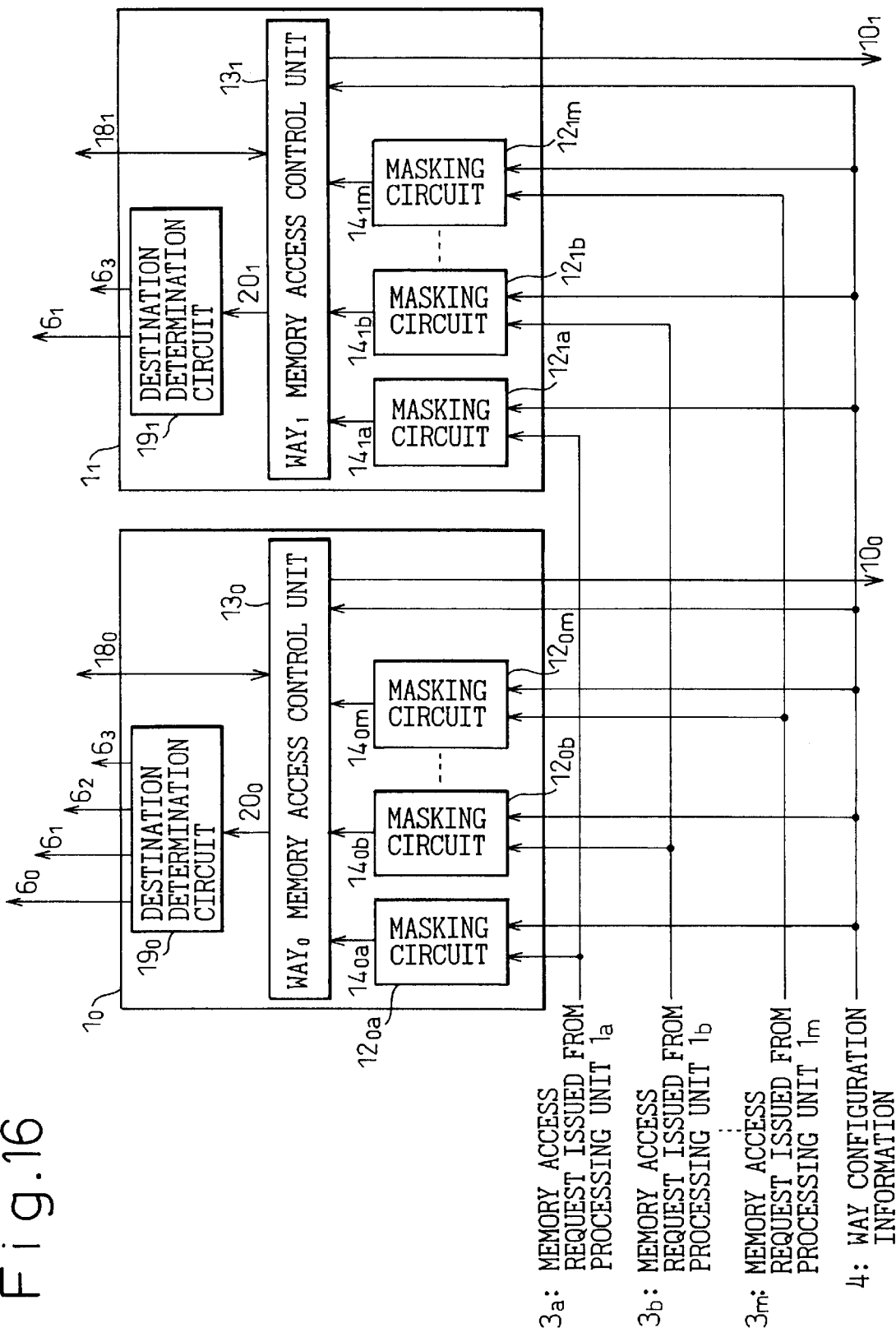
FIG. 16 shows the configurations of memory access control units shown in FIG. 15 (part 1)
Figure 17:
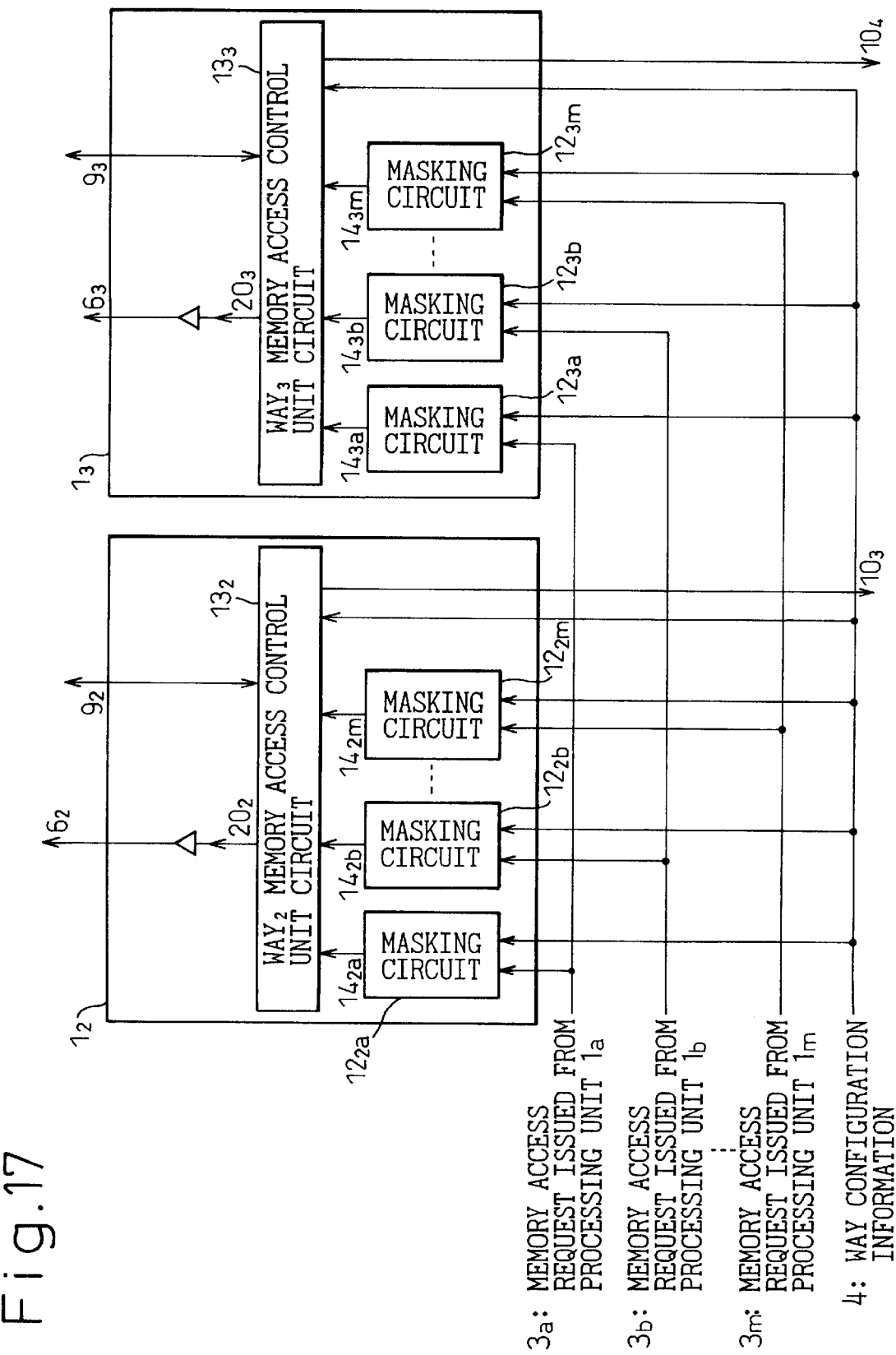
FIG. 17 shows the configurations of memory access control units shown in FIG. 15 (part 2)

FIGS. 16 and 17 show the configurations of the memory access control units $1_0$ to $1_3$. The way configuration information 4 as well as the memory access requests $3a$ to $3m$ are input to the masking circuits $12_{0a}$ to $12_{3m}$ in the memory access control units $1_0$ to $1_3$. The configuration shown in FIG. 11 according to the second embodiment is adopted as the configuration of the masking circuits $12_{0a}$ to $12_{3m}$. The memory access control units $1_0$ to $1_3$ selected depending on the number of ways specified in the way configuration information 4 are enabled to operate.

For activating a fixed number of tag RAMs $3_0$ to $3_3$, by means a decreased number of memory access control units $1_0$ to $1_3$, destination determination circuits $19_0$ and $19_1$ are included.

In the memory access control unit to enabled to operate to whichever value of 1 to 4 the number of ways is set, the destination determination circuit $19_0$ is included for determining requests to be sent over the activation request lines $6_0$ to $6_3$ routed to all the four tag interfaces. In the memory access control unit 11 enabled to operate when the number of ways is 2 or 4, the destination determination circuit $19_1$ is included for determining requests to be sent over the two tag interface activation request lines $6_1$ and $6_3$. In the memory access control units 12 and $1_3$ enabled to operate only when the number of ways is 4, no destination determination circuit is included. A request is output over the associated tag interface activation request line 62 or $6_3$.

Figure 18A:
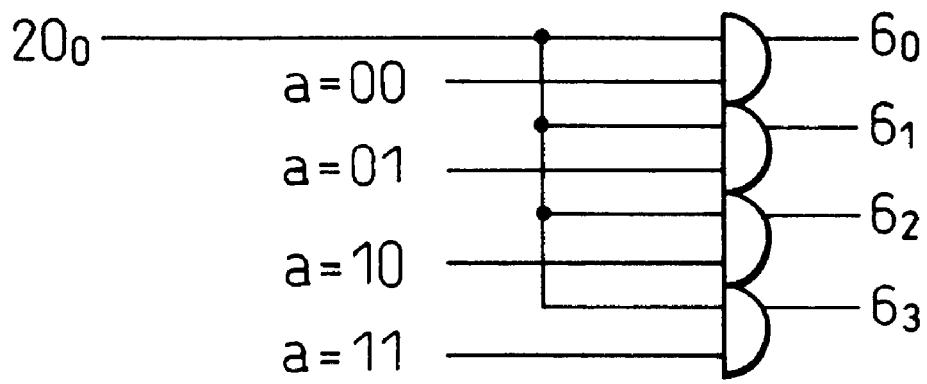
FIGS. 18A and 18B show the configurations of destination determination circuits shown in FIG. 16.
Figure 18B:
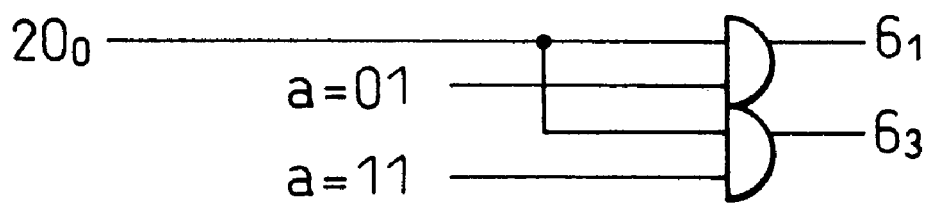

FIGS. 18A and 18B show the configurations of the destination determination circuits. FIG. 18A shows the destination determination circuit $19_0$ in the memory access control unit 10 enabled to operate when the number of ways is any of 1 to 4. A way passing through a tag interface to be activated by the destination determination circuit $19_0$ is determined with a memory address a<7:6>. For example, when 10 is specified for a memory address a<7:6>, a request to be sent over the tag interface activation request line $6_2$ is made active.

FIG. 18B shows in detail the destination determination circuit $19_1$ in the memory access control unit $1_1$ enabled to operate when the number of ways is 2 or 4. The destination determination circuit $19_1$ gates an input relative to an address a<7:6>, whereby a tag interface to be activated is determined. For example, when an access request is issued for an address a<7:6>=11, the tag interface activation request $6_3$ is made active.

The merging circuits $15_1$ to $15_3$ in FIG. 15 will be described. To the tag interface $2_0$ on the way $WAY_0$, a request is supplied from the memory access control unit $1_0$ alone over the activation request line $6_0$ without being passed through a merging circuit. To the tag interface $2_1$ on the way $WAY_0$, requests output from the two memory access control units $1_0$ and $1_1$ over the activation request line $6_1$ and merged by the merging circuit $15_1$ are supplied as a merged activation request $17_1$.

To the tag interface $2_2$ on the way $WAY_2$, requests output from the two memory access control units $1_0$ and $1_2$ over the activation request line $6_2$ and merged by the merging circuit $15_2$ are supplied as a merged activation request $17_2$. To the tag interface $2_3$ on the way $WAY_3$, requests output from the three memory access control units $1_0$, $1_1$, and $1_3$ over the activation request line $6_3$ and merged by the merging circuit $15_3$ are supplied as a merged activation request $17_3$. The way configuration information 4 is input to the merging circuits $15_1$ to $15_3$.

Figure 19A:
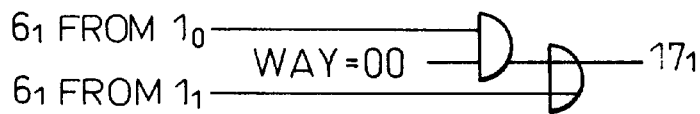
FIGS. 19A, 19B and 19C show the configurations of merging circuits for merging activation requests shown in FIG. 15.
Figure 19B:
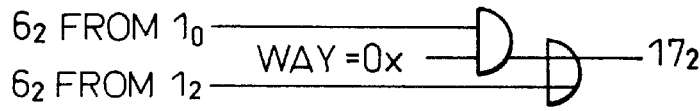
Figure 19C:
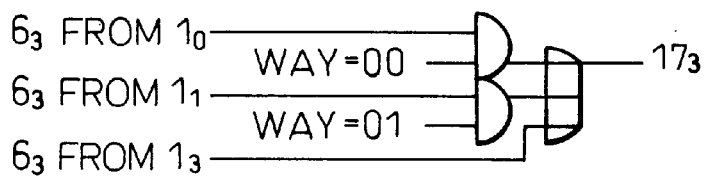

FIGS. 19A, 19B and 19C show the configurations of the merging circuits $15_1$ to $15_3$. FIG. 19A shows the configuration of the merging circuit 151 on the way $WAY_1$. A request output from the memory access control circuit $1_0$ over the activation request line $6_1$ is gated relative to the way configuration information 4 (way<1:0>=00), and then output as an activation request $17_1$ from the OR gate. A request output from the memory access control circuit $1_1$ on the way $WAY_1$ over the activation request line $6_1$ is output as the activation request $17_1$ directly from the OR gate.

FIG. 19B shows the configuration of the merging circuit $15_2$ on the way $WAY_2$. A request output from the memory access control circuit $1_0$ over the activation request line $6_2$ is gated relative to the way configuration information 4 (way<1:0>=0x) and then output as an activation request $17_2$ from the OR gate. A request output from the memory access control circuit $1_2$ on the way $WAY_2$ is output as the activation request $17_2$ directly from the OR gate.

FIG. 19C shows the configuration of the merging circuit $15_3$ on the way $WAY_3$. A request output from the memory access control circuit to over the activation request line $6_3$ is gated relative to the way configuration information 4 (way <1:0>=00) and then output as an activation request $17_3$ from the OR gate. A request output from the memory access control line $1_1$ on the way $WAY_1$ over the activation request line $6_3$ is gated relative to the way configuration information 4 (way<1:0>=01) and then output as an activation request $17_3$ from the OR gate. The activation request $6_3$ output from the memory access control circuit $1_3$ on the way $WAY_3$ is output as an activation request $17_2$ directly from the OR gate.

The merging circuits $16_0$ and $16_1$ for merging results of indexing shown in FIG. 15 will be described. Results of indexing $9_0$ to $9_3$ sent from all the tag interfaces $2_0$ to $2_3$ and the way configuration information 4 are input to the merging circuit $16_0$ on the way $WAY_0$. A merged result of indexing $18_0$ is then output. Results of indexing sent from the tag interfaces $2_1$ and $2_3$ on the ways $WAY_1$ and $WAY_3$ over the resultof-indexing lines $9_1$ and $9_3$ and the way configuration information 4 are input to the merging circuit $16_1$ on the way $WAY_1$. A merged result of indexing $18_1$ is then output. As for the ways $WAY_1$ and $WAY_3$, a result of indexing sent from the tag interface $2_2$ or $2_3$ over the result-of-indexing line $9_2$ or $9_3$ is input directly to the memory access control unit $1_2$ or $1_3$.

Figure 20A:
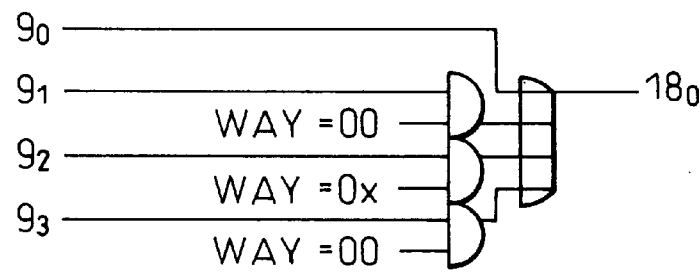
FIGS. 20A and 20B show the configurations of merging circuits for merging results of indexing shown in FIG. 15.
Figure 20B:
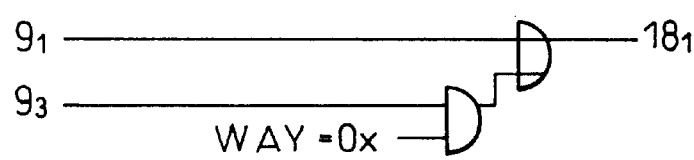

FIGS. 20A and 20B show the configurations of the merging circuits $16_0$ and $16_1$ for merging results of indexing. FIG. 20A shows the configuration of the merging circuit $16_0$ on the way $WAY_0$. A result of indexing output from the tag interface $2_0$ over the result-ofindexing line $9_0$ is output as a result of indexing $18_0$ directly from the OR gate. A result of indexing output from the tag interface $2_1$ over the result-of-indexing line $9_1$ is gated relative to the way configuration information 4 (way <1:0>=00) and then output as the result of indexing $18_0$ from the OR gate. A result of indexing output from the tag interface $2_2$ over the result-of-indexing line $9_2$ is gated relative to the way configuration information 4 (way<1:0>=0x) and then output as the result of indexing $18_0$ from the OR gate. A result of indexing output from the tag interface $2_3$ over the result-of-indexing line $9_3$ is gated relative to the way configuration information 4 (way<1:0>=00) and then output as the result of indexing $18_0$ from the OR gate.

FIG. 20B shows the configuration of the merging circuit $16_1$ on the way $WAY_1$. A result of indexing output from the tag interface $2_1$ over the result-of-indexing line $9_1$ is output as a result of indexing $18_1$ directly from the OR gate. A result of indexing output from the tag interface $2_3$ over the result-of-indexing line $9_3$ is gated relative to the way configuration information 4 (way<1:0>=0x) and then output as the result of indexing $18_1$ from the OR gate.

Figure 21A:
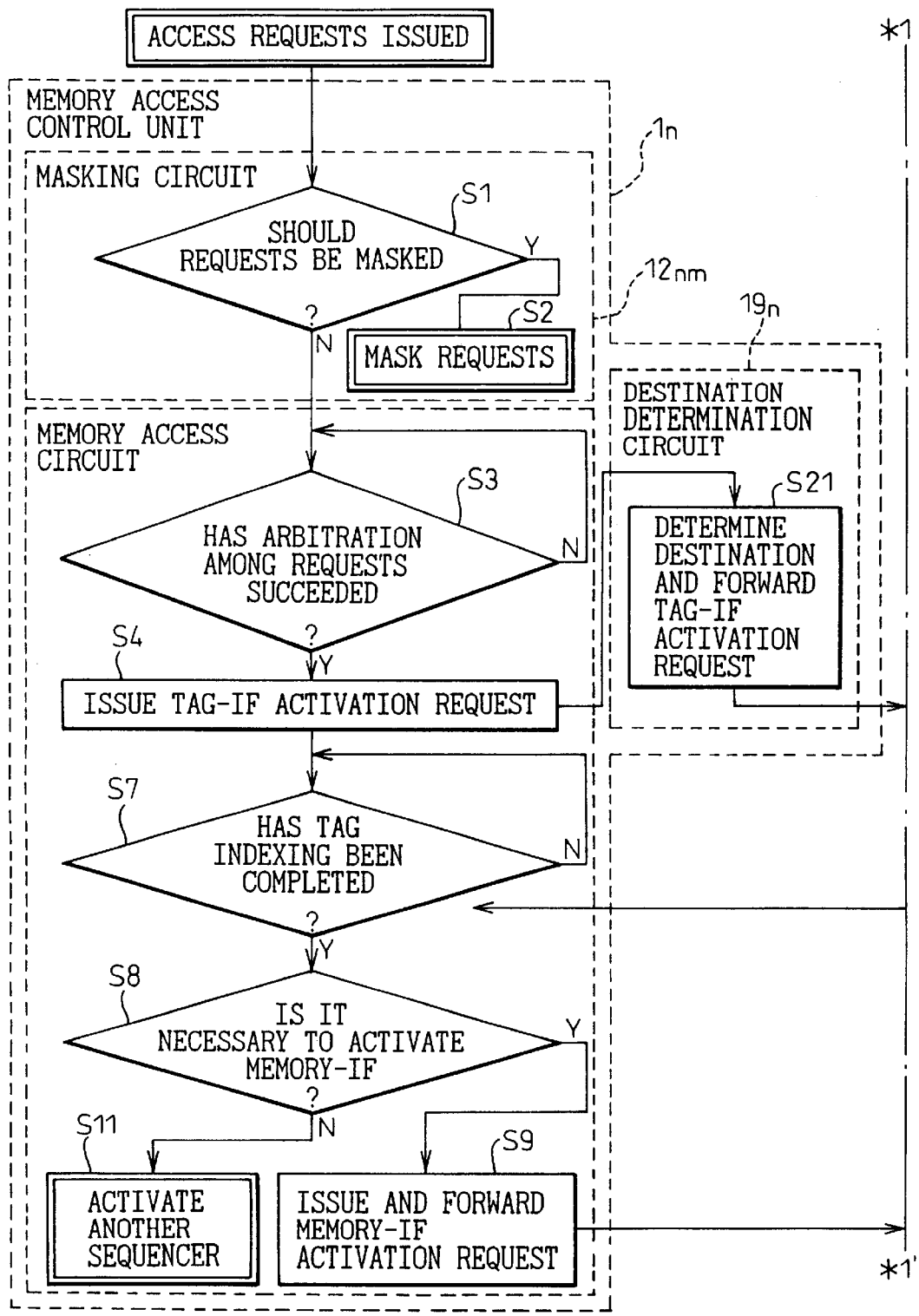
FIGS. 21A and 21B are flowcharts describing the operations of the system shown in FIG. 15.
Figure 21B:
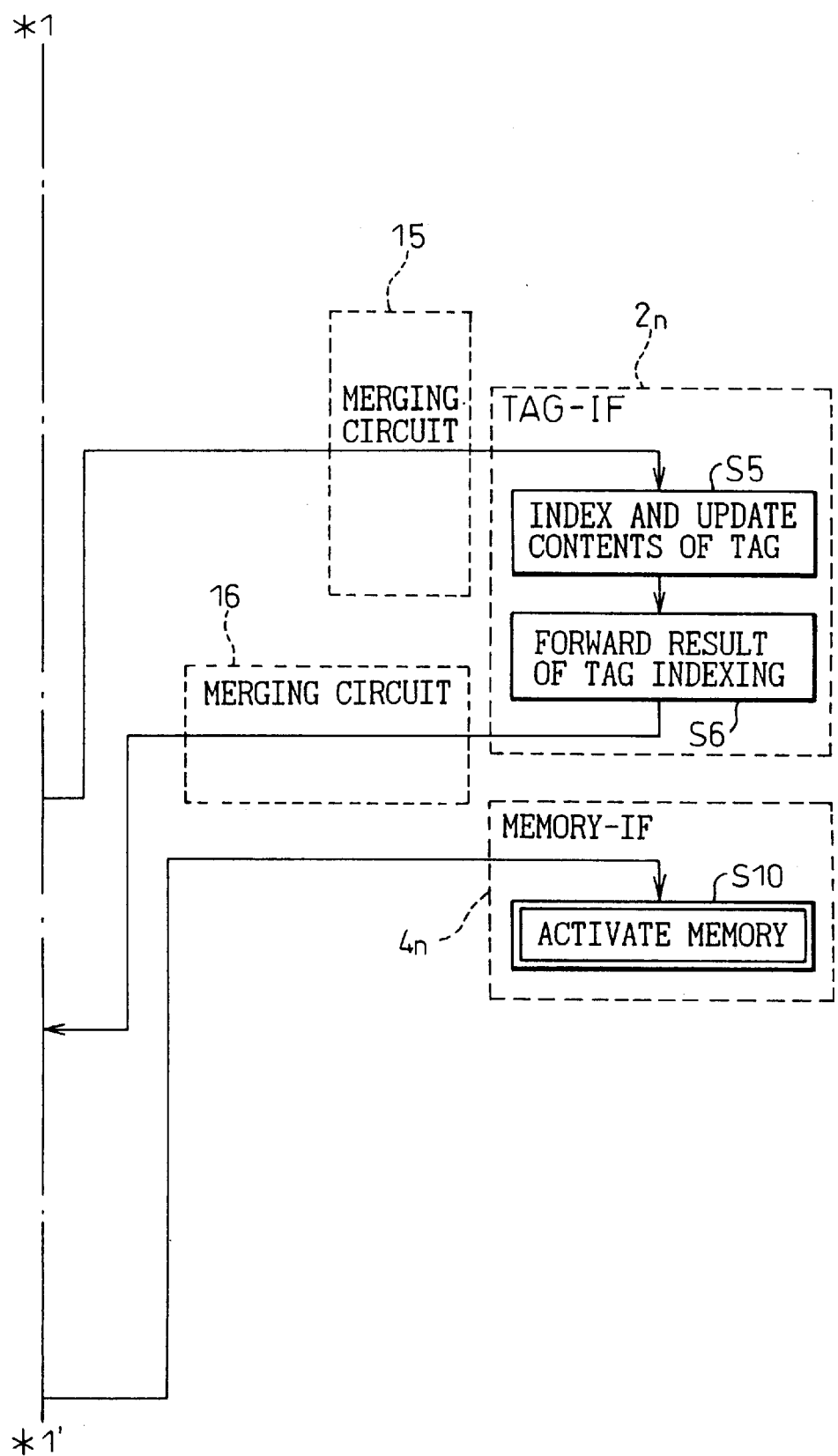

Referring to FIGS. 21A and 21B, the operations in the third embodiment of the present invention will be described. The flowchart of FIG. 21 is nearly identical to that of FIG. 8 concerning the first embodiment. Only a difference from the flowchart of FIG. 8 will be described.

When activation requests for tag interfaces are issued at step S4, destinations are determined by the destination determination circuits 19n at step S21. Tag interface activation requests are then output. The requests are transmitted to the tag interfaces 2n directly or via the merging circuits. Results of indexing output from the tag interfaces 2n are transmitted to the memory access control units in directly or via the merging circuits.

As a result, in the third embodiment, the conditions for activation of the memory access control units are as listed in FIGS. 22A, 22B and 22C. FIG. 22A lists the conditions for activation to be met when a configuration including one way is designated. FIG. 22B lists the conditions for activation to be met when a configuration including two ways is designated. FIG. 22C lists the conditions for activation to be met when a configuration including four ways is designated. In each drawing, ○ indicates that the memory access control unit is activated, and × indicates that the memory access control unit is not activated.

FIGS. 22A, 22B and 22C should be referenced as mentioned below. Referring to FIG. 22A, when a configuration including one way is designated, whichever of 00 to 11 is specified for a memory address a<7:6>, only the memory access control unit $1_0$ on the way $WAY_0$ is activated. The memory access control unit to activates all the tag RAMs $3_0$ to $3_3$ and the memory $4_0$ to which the way $WAY_0$ leads.

Referring to FIG. 22B, when a configuration including two ways is designated, if a=00 or 10 is specified, the memory access control unit $1_0$ on the way $WAY_0$ is activated. The memory access control unit to activates the tag RAMs $3_0$ and $3_2$ on the ways $WAY_0$ and $WAY_2$ and the memory $4_0$ to which the way $WAY_0$ leads. If a=O1 or 11 is specified, the memory access control unit $1_1$ on the way $WAY_1$ is activated. The memory access control unit $1_1$ activates the tag RAMs $3_1$ and $3_3$ on the ways $WAY_1$ and $WAY_3$ and the memory $4_1$ to which the way $WAY_1$ leads.

Referring to FIG. 22C, when a configuration including four ways is designated, if a=00 is specified, the memory access control unit to on the way $WAY_0$ is activated and in turn activates the tag RAM $3_0$ and memory $4_0$. If a=01 is specified, the memory access control unit 11 on the way $WAY_1$ is activated and in turn activates the tag RAM $3_1$ and memory $4_1$. If a=10 is specified, the memory access control unit $1_2$ on the way $WAY_2$ is activated and in turn activates the tag RAM $3_2$ and memory $4_2$. If a=I1 is specified, the memory access control unit $1_3$ on the way $WAY_2$ is activated and in turn activates the tag RAM $3_3$ and memory $4_3$.

(Fourth Embodiment)

An example in which the number of connection signal lines linking the memory access control units $1_0$ to $1_n$ and the tag interfaces $2_0$ to $2_n$, which are included in the system of the third embodiment in which the number of ways leading to the memories can be changed, can be decreased drastically will be described as the fourth embodiment. Even in the fourth embodiment, the description will proceed on the assumption that the number of ways is four.

FIG. 23 shows the configuration of a system controller. The system controller will be described briefly. Like the system controller shown in FIG. 15 according to the third embodiment, the way configuration information 4 is input together with the memory access requests 3a to 3m to the memory access control units $1_0$ to $1_3$. Requests sent from the memory access control units $1_0$ to $1_3$ over the tag interface activation request lines $6_0$ to $6_3$ are output directly to the tag interfaces $2_0$ to $2_3$.

Results of indexing output from the tag interfaces $2_0$ to $2_3$ over the result-of-indexing lines $9_0$ to $9_n$ are, like those shown in FIG. 15 according to the third embodiment, input to the memory interfaces $4_0$ to $4_3$ via the merging circuits $16_0$ and $16_1$ or directly. Requests issued from the memory access control units $1_0$ to $1_3$ are also output to the memory interfaces $4_0$ to $4_n$ over the memory interface activation request lines $10_0$ to $10_n$.

Figure 24:
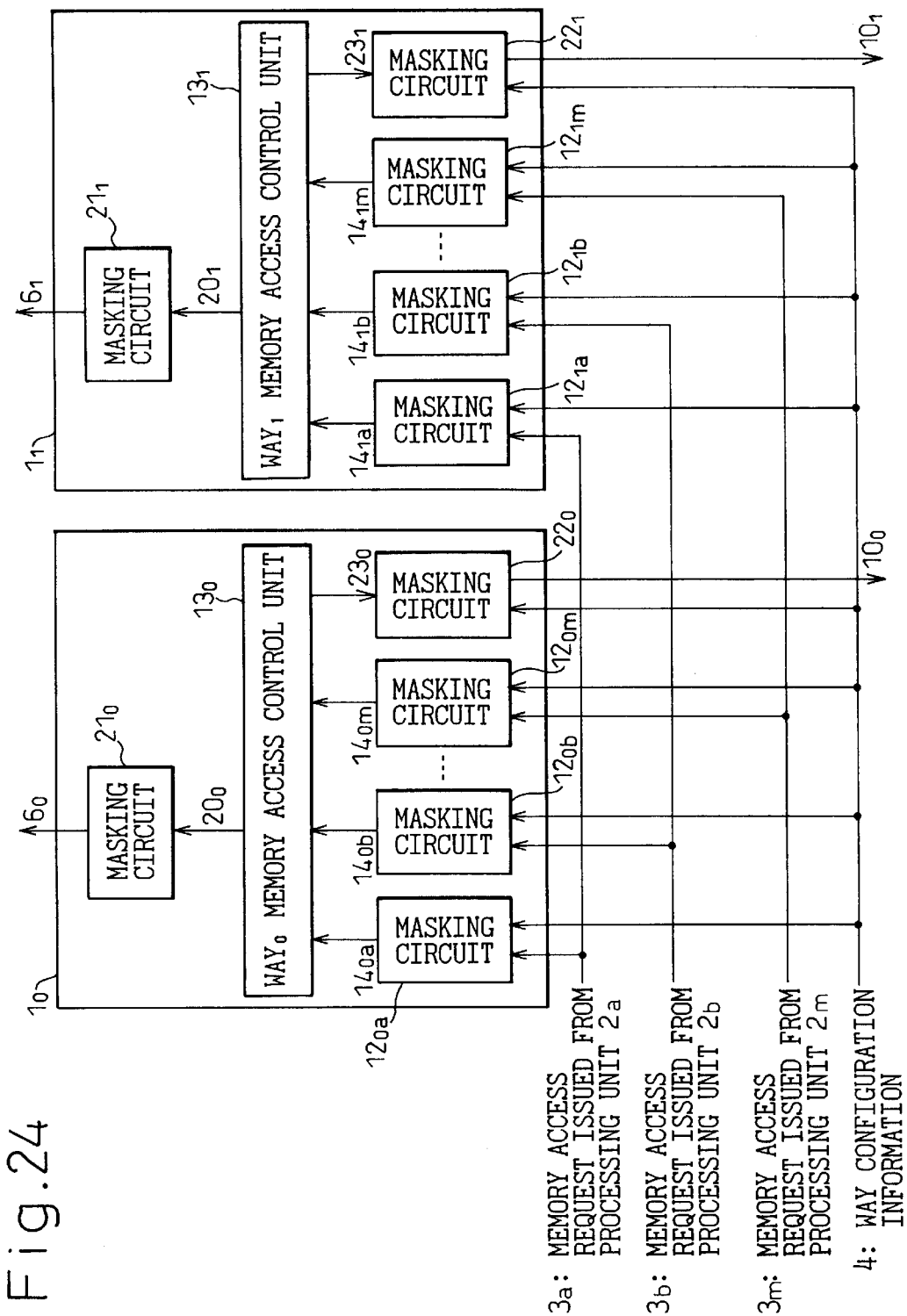
FIG. 24 shows the configurations of memory access control units shown in FIG. 23 (art 1)

FIGS. 24 and 25 show the configurations of the memory access control units 10 to $1_3$. The memory access control unit $1_0$ on the way $WAY_0$ includes the memory access request masking circuits $12_{0a}$ to $12_{nm}$ tag interface activation request masking circuit $21_0$, and memory interface activation request masking circuit $22_0$. The memory access requests $3a$ to $3m$ issued from the processing units $2a$ to $2m$ and the way configuration information 4 are input to the memory access request masking circuits $12_0$ to $12_n$. The other memory access control units 11 to 13 on the ways $WAY_1$ to $WAY_3$ have the same configuration.

FIGS. 26A, 26B, 26C and 26D show the configurations of the last memory access request masking circuits $12_{0m}$ to $12_{3m}$ in the memory access control units 10 to 13. The last memory access request $3m$ is therefore input to the masking circuits $12_{0m}$ to $12_3m$.

Figure 26A:
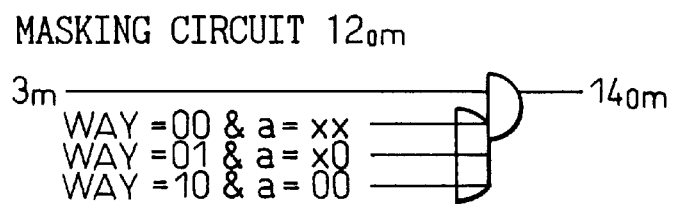
FIGS. 26A, 26B, 26C and 26D show the configurations of memory access request masking circuits shown in FIGS. 24 and 25.

FIG. 26A shows the masking circuit $12_{0m}$ on the way $WAY_0$. For gating the memory access request $3m$, way configuration information 00 and a memory address a<7:6>=xx (where x denotes any numeral) are ANDed, way configuration information 01 and a memory address a=x0 are ANDed, and way configuration information 10 and a memory address a=00 are ANDed. The OR of the ANDS and the memory access request $3m$ are then ANDed. A signal passed by the gate is output as a memory access request $14_{0m}$ to the memory access control unit $10_1$.

Figure 26B:
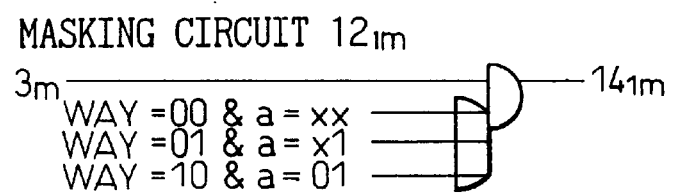
Figure 26C:
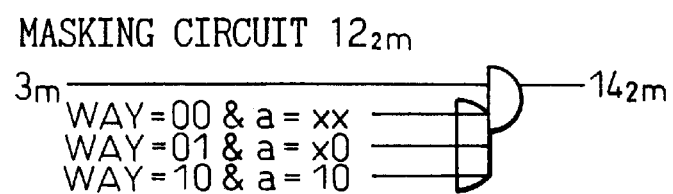
Figure 26D:
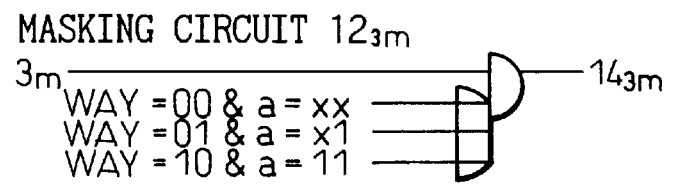
Figure 27A:
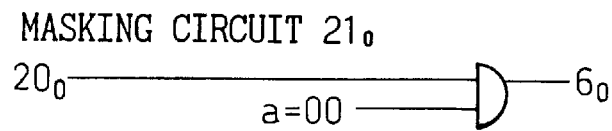
FIGS. 27A, 27B, 27C and 27D show the configurations of tag interface activation request. masking circuits shown in FIGS. 24 and 25.
Figure 27B:
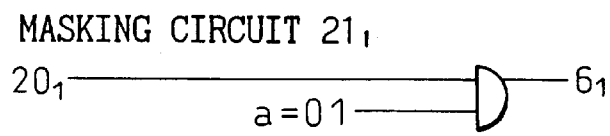
Figure 27C:
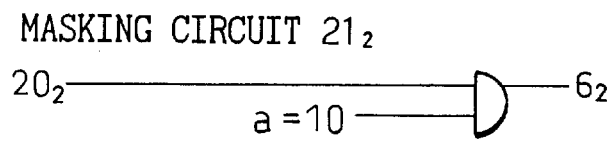
Figure 27D:
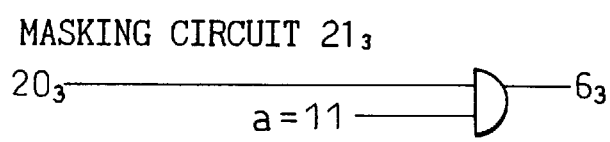

FIGS. 26B, 26C and 26D show the masking circuits $12_{1m}$ to $12_{3m}$ on the ways $WAY_1$ to $WAY_3$ which have nearly the same configuration as that shown in FIG. 26A.

FIGS. 27A, 27B, 27C and 27D show the configurations of the tag interface activation request masking circuits. Specifically, FIGS. 27A, 27B, 27C and 27D show the masking circuits $21_0$ to $21_3$ on the ways $WAY_0$ to $WAY_3$. The tag interface activation requests $20_0$ to $20_3$ issued from the memory access control units $1_0$ to $1_3$ are gated relative to memory addresses a<7:6>=00 to 11, and output as requests over the tag interface activation request lines $6_0$ to $6_3$.

The configuration of the merging circuits $16_0$ and $16_1$ shown in FIG. 23 is identical to that shown in FIG. 2 according to the third embodiment. Results of indexing output from the tag interfaces $2_0$ to $2_3$ over the result-of-indexing lines $9_0$ to $9_3$ are input as results of indexing $18_1$ and $18_2$ to the memory interfaces $4_0$ to $4_3$ via the merging circuits $16_0$ and $16_1$ or input as requests directly to the memory interfaces $4_0$ to $4_3$. Aside from the results of indexing, requests are input from the memory access control unit $1_0$ to $1_3$ to the memory interfaces $4_0$ to $4_3$ over the memory interface activation request lines $10_0$ to $10_3$.

FIGS. 28A, 28B, 28C and 28D show the configurations of the memory interface activation request masking circuits in the memory access control units $1_0$ to $1_3$.

Figure 28A:
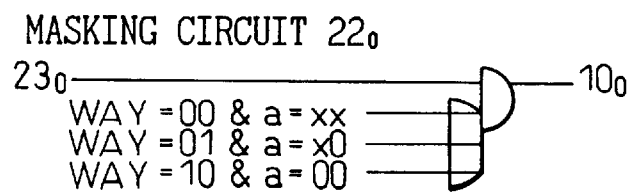
FIGS. 28A, 28B, 28C and 28D show the configurations of memory interface activation request masking circuits shown in FIGS. 24 and 25.

To the masking circuit $22_0$ on the way $WAY_0$ in FIG. 28A, the memory interface activation request $23_0$ issued from the memory access control circuit $13_0$ is input. For gating the activation request $23_0$, way configuration information 00 and a memory address a<7:6>=xx are ANDed, way configuration information 01 and a memory address a=x0 are ANDed, and way configuration information 10 and a memory address a=00 are ANDed. The OR of the ANDS and the activation request are then ANDed. A signal passed by the gate is output as a request to the memory interface $4_0$ over the memory interface activation request line $10_0$.

Figure 28B:
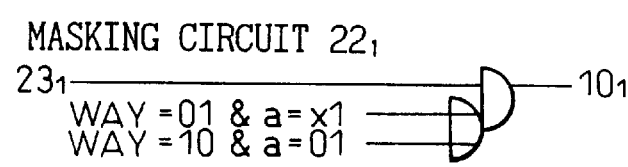

To the masking circuit $22_1$ on the way $WAY_1$ in FIG. 28B, the memory interface activation request $23_1$ issued from the memory access control circuit $13_1$ is input. For gating the activation request $23_1$, way configuration information 01 and a memory address a=x1 are ANDed, and way configuration information 10 and a memory address a=01 are ANDed. The OR of the ANDs and the activation request are then ANDed. A signal passed by the AND gate is output as a request to the memory interface $4_1$ over the memory interface activation request line $10_1$.

Figure 28C:
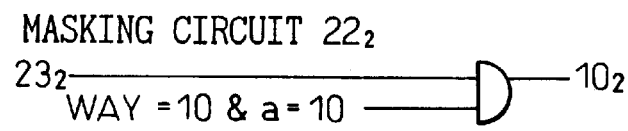

To the masking circuit $22_2$ on the way $WAY_2$ in FIG. 28C, the memory interface activation request $23_2$ issued from the memory access control circuit $13_2$ is input. Way configuration information 10 and a memory address a=10 are ANDed. The AND and activation request are then ANDed. A signal passed by the gate is output as a request to the memory interface $4_2$ over the memory interface activation request line $10_2$.

Figure 28D:
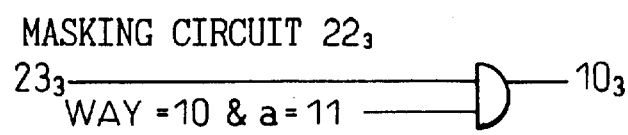

To the masking circuit $22_3$ on the way $WAY_3$ in FIG. 28D, the memory interface activation request $23_3$ issued from the memory access control circuit $13_3$ is input. Way configuration information 10 and a memory address a=11 are ANDed. The AND and activation request are then ANDed. A signal passed by the gate is output as a request to the memory interface $2_3$ over the memory interface activation request line $10_3$.

As a result, according to the fourth embodiment, the conditions for activation of the memory access control units are those listed in FIGS. 29A, 29B and 29C. FIG. 29A lists the conditions for activation to be met when a configuration including one way is designated. FIG. 29B lists the conditions for activation to be met when a configuration including two ways is designated. FIG. 29C lists the conditions for activation to be met when a configuration including four ways is designated. In each drawing, ○ indicates that the memory access control unit is activated and × indicates that the memory access control unit is not activated.

FIGS. 29A, 29B and 29C should be referenced as described below. Referring to FIG. 29A, when the configuration including one way is designated, all the memory access control units $1_0$ to $1_3$ are activated. The memory interface $4_0$ on the way $WAY_0$ is activated by the memory access control unit $1_0$ on the way $WAY_0$. When a=00 is specified, the tag interface $2_0$ on the way $WAY_0$ is activated by the memory access control unit $1_0$ on the way $WAY_0$. When a=01 is specified, the tag interface $2_1$ on the way $WAY_0$ is activated by the memory access control unit $1_1$ on the way $WAY_0$. When a=10 is specified, the tag interface $2_2$ on the way $WAY_2$ is activated by the memory access control unit $1_2$ on the way $WAY_2$. When a=11 is specified, the tag interface $2_3$ on the way $WAY_3$ is activated by the memory access control unit $1_3$ on the way $WAY_3$.

Referring to FIG. 29B, when the configuration including two ways is designated, if a=00 or 10 is specified, the memory access control units $1_0$ and $1_2$ on the ways $WAY_0$ and $WAY_2$ are activated. If a=01 or 11 is specified, the memory access control units $1_1$ and $1_3$ on the ways $WAY_1$ and $WAY_3$ are activated.

If a=00 is specified, the memory access control unit $1_0$ on the way $WAY_0$ activates the tag interface $2_0$ and memory interface $4_0$ on the way $WAY_0$. If a=01 is specified, the memory access control unit $1_1$ on the way $WAY_0$ activates the tag interface $2_1$ and memory interface $4_1$ on the way $WAY_1$. If a=10 is specified, the memory access control unit $1_0$ on the way $WAY_0$ activates the memory interface $4_0$ on the way $WAY_0$, and the memory access control unit $1_2$ on the way $WAY_2$ activates the tag interface $2_2$ on the way $WAY_2$. If a=11 is specified, the memory access control unit $1_1$ on the way $WAY_1$ activates the memory interface $4_1$ on the way $WAY_1$, and the memory access control unit $1_3$ on the way $WAY_3$ activates the tag interface $3_3$ on the way $WAY_3$.

Referring to FIG. 29C, when the configuration including four ways is designated, if a=00 is specified, the memory access control unit $1_0$ on the way $WAY_0$ is activated and in turn activates the tag interface $2_0$ and memory interface $4_0$. If a=01 is specified, the memory access control unit $1_1$ on the way $WAY_0$ is activated and in turn activates the tag interface $2_0$ and memory interface $4_1$. If a=10 is specified, the memory access control unit $1_1$ on the way $WAY_1$ is activated and in turn activates the tag interface $2_2$ and memory interface $4_2$. If a=11 is specified, the memory access control unit $1_3$ on the way $WAY_3$ is activated and in turn activates the tag interface $2_3$ and memory interface $4_3$.

Figure 30:
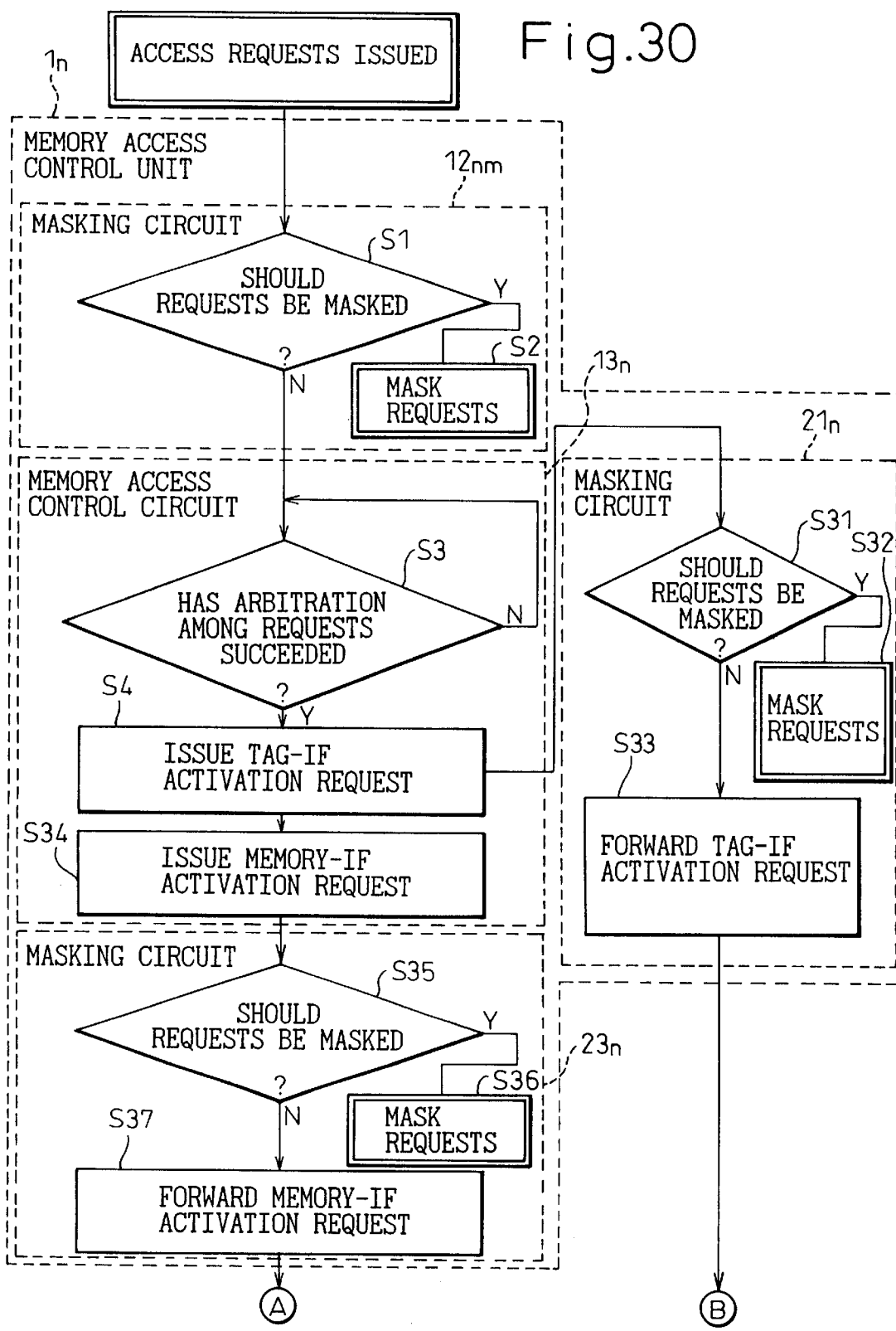
FIG. 30 is a flowchart describing the operations of the system shown in FIG. 23 (part 1)
Figure 31:
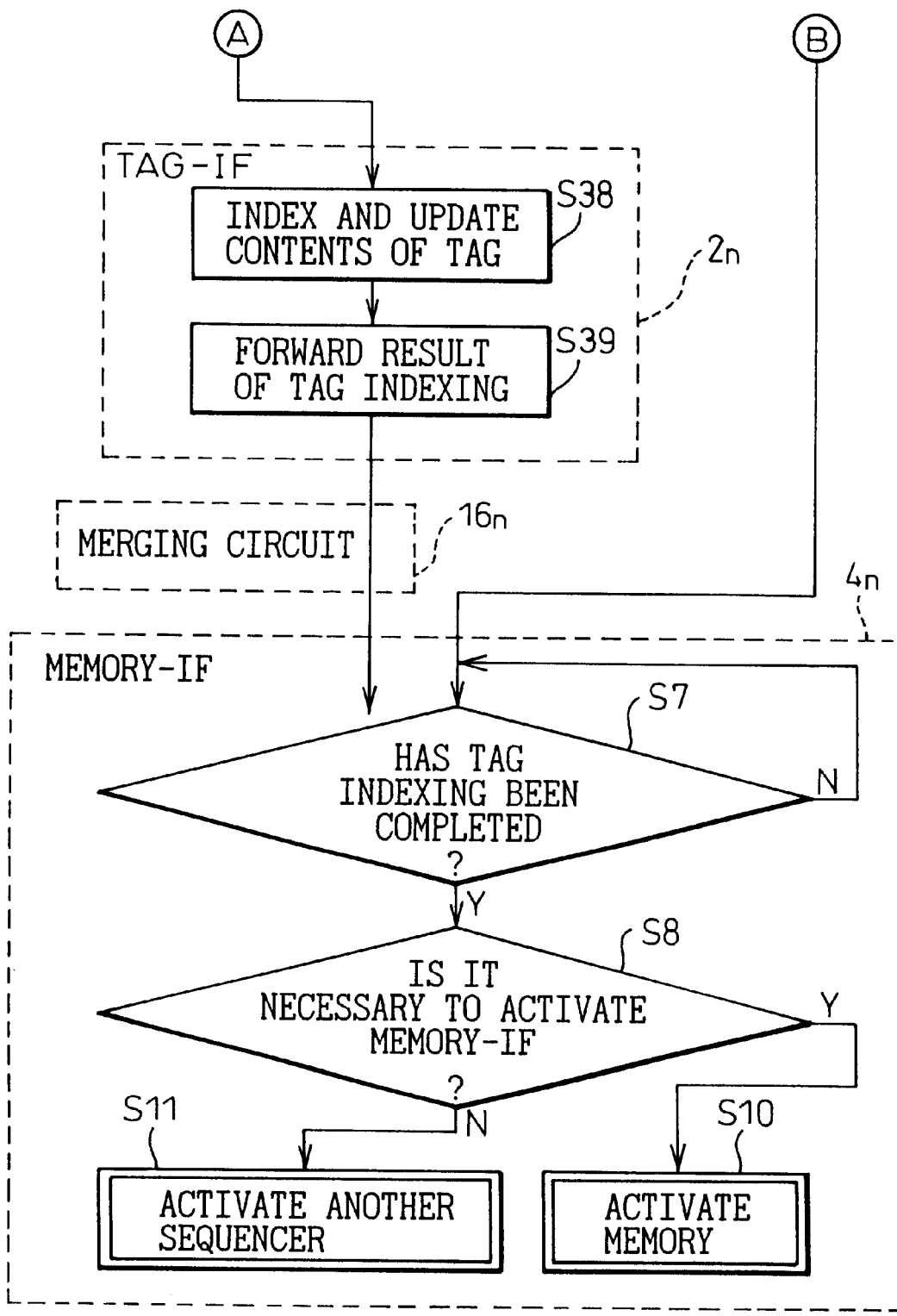
FIG. 31 is a flowchart describing the operations of the system shown in FIG. 23 (part 2)

Referring to FIGS. 30 and 31, the operations in the foregoing fourth embodiment will be described.

Figure 8:
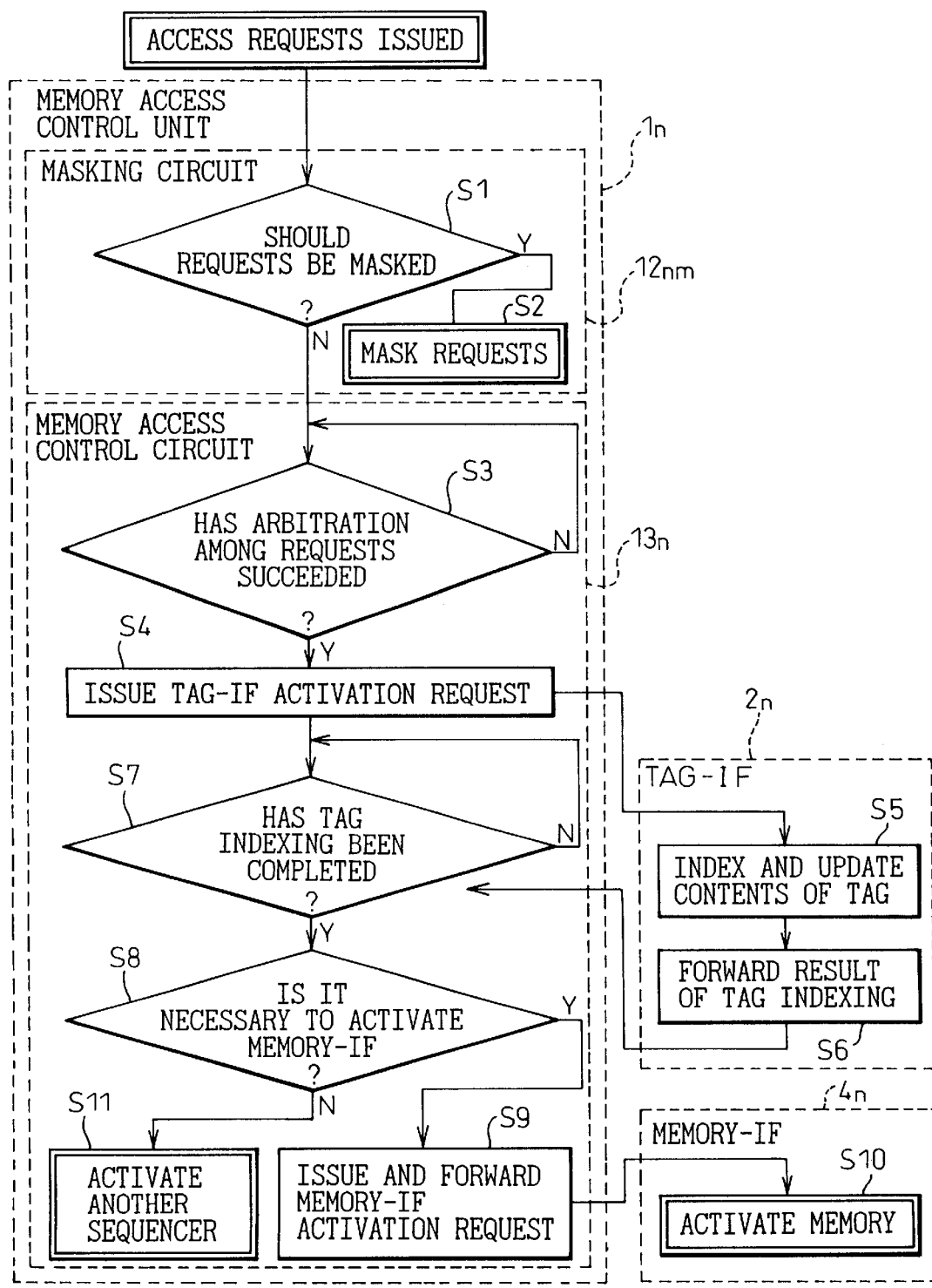
FIG. 8 is a flowchart describing the operations of the system shown in FIG. 4.

Steps S1 to S4 are identical to those described in FIG. 8 according to the first embodiment or those described in FIG. 21 according to the third embodiment. When the tag interface activation requests are issued from the memory access control circuits $13_0$ to $13_n$ (step S4), the tag interface masking circuits $21_0$ to $21_n$ judge whether or not the requests should be masked (step S31). Requests that should be masked are masked (step S32), and requests that should not be masked are output as tag interface activation requests $20_0$ to $20_n$ (step S33).

The memory interface masking circuits $23_0$ to $23_n$ to which the memory interface activation requests are input (step S34) judge whether or not the requests should be masked (step S35). Requests that should be masked are masked (step S36) and requests that should not be masked are output as the memory interface activation requests $10_0$ to $10_n$ (step S37).

The tag interfaces $2_0$ to $2_n$ index and update the contents of the tags (step S38), and output the results of tag indexing $9_0$ to $9_n$ (step S39).

The results of tag indexing $9_0$ to $9_n$ and the requests sent over the memory interface activation request lines $10_0$ to $10_n$ are input to the memory interfaces $4_0$ to $4_n$. It is awaited that the tag indexing is completed (step S7). When the tag indexing is completed, it is judged whether or not memory access is needed (step S8). If memory access is needed, the memory interfaces $2_0$ to $2_n$ are activated (step S10). If it is judged that memory access is not needed, another sequencer is activated (step S 1 ). Practical examples of memory devices, cache memories, tags, and tag RAMs Practical examples of the contents of memory devices, cache memories, tags, and tag RAMs employed in the aforesaid embodiments will be described. Assume that the number of ways is four.

FIG. 32 shows practical examples of the contents of the memory devices $5_0$ to $5_n$ and reveals the relationships between memory addresses and the contents thereof to be established in the configurations including one way, two ways, and four ways respectively. First, it is seen that as long as the storage capacities of the memory devices $5_0$ to $5_3$ are the same, when the number of ways gets larger, the amount of data stored increases. Secondly, it is seen that in the configuration including one way, all the data is stored in the memory device $4_0$ on the way $WAY_0$, that in the configuration including two ways, all the data is interleaved in the memory devices $5_0$ and $5_1$ on the ways $WAY_0$ and $WAY_1$, and that in the configuration including four ways, all the data is interleaved in the memory devices $5_0$ to $5_3$ on the ways $WAY_0$ to $WAY_3$.

FIGS. 33A, 33B and 33C show the relationships between memory devices and memory addresses to be established in the configurations including different numbers of ways. In the drawings, x denotes any numeral. Referring to FIG. 33A, in the configuration including four ways, a way is specified with a memory address a <7:6>. Referring to FIG. 33B, in the configuration including two ways, a way is specified with a memory address a<6>. Referring to FIG. 33C, in the configuration including one way, the way $WAY_0$ is specified irrespective of a memory address.

Figure 35A:
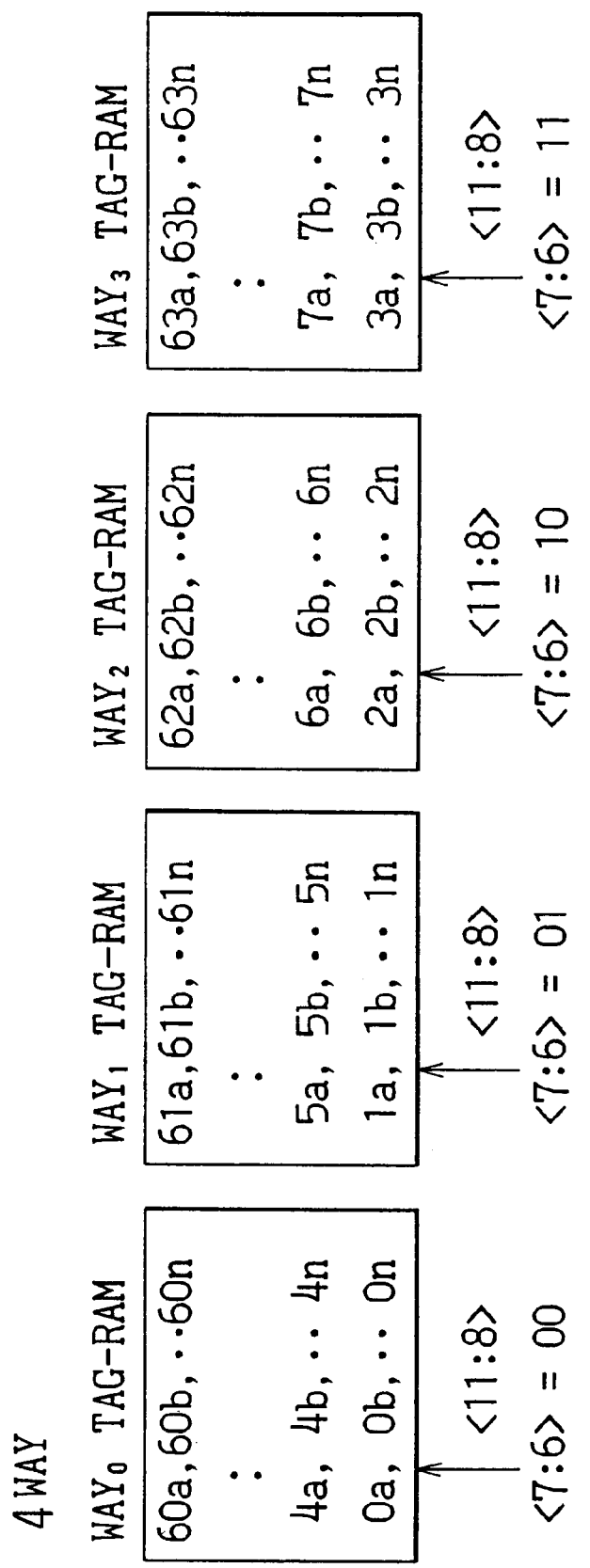

FIGS. 34, 35A, 35B and 35C show the relationships between cache memories in the processing units $2a$ to $2m$, tags, and tag RAMs. FIG. 34 shows the relationships of correspondence between the cache memories in the processing units $2a$ to $2m$ and tags. FIGS. 35A, 35B and 35C show arrangements of data items stored in the tag RAMs according to the third embodiment. FIG. 35A shows the arrangements adopted for the configuration including four ways. FIG. 35B shows the arrangements adopted for the configuration including two ways. FIG. 35C shows the arrangements adopted for the configuration including one way. The contents of the tags shown in FIG. 34 ($0a$ to $63a$, $0b$ to $63b$, etc., and $0n$ to $63n$) are, as shown in FIG. 35, stored in the tag RAMs or tag RAM in different manners depending on the number of ways.

As described so far, according to the present invention, the performance of memory access to be carried out in a configuration including ways can be improved. This contributes greatly to an increase in operating speed of an information processing system. Moreover, common use of a module or a decrease in number of signal lines linking modules can be achieved with the addition of a simple circuit. This contributes greatly to a reduction in period of logical or physical design and an increase in density of the components to be integrated.

What is claimed is:

1. An apparatus, comprising:

a plurality of processing units each respectively having a cache memory;

a plurality of memory devices;

a plurality of tag memories in which copies of tags of said first memories are stored, and a system controller connected to said processing units, memory devices, and tag memories for controlling memory access in response to access requests issued from said processing units, said system controller comprising a plurality of memory interfaces each corresponding to one of said memory devices, and each corresponding to one of a plurality of ways, a plurality of tag interfaces respectively connected to each of said tag memories, and each corresponding to one of the plurality of ways, and a plurality of access control units, one corresponding to each of the plurality of ways, for accessing said memory devices on an interleaving basis via said memory interfaces in response to access requests issued from said processing units, and accessing said tag memories on the interleaving basis via said tag interfaces, wherein information concerning the number of ways is input to said access control units, and based on the inputted information, the number of ways leading to said second memory devices is decreased.

2. An apparatus according to claim 1, wherein each of said access control units comprises masking circuits each of which, when an address specified in a memory access request corresponds to the way on which the access control unit is installed and a way specified with said information concerning the number of ways agrees with said way, passes the memory access request alone and masks the other memory access requests, and thus decreases the number of ways leading to said second memory devices.

3. An apparatus according to claim 1, wherein when said access control units decrease the number of ways leading to said second memory devices, the number of ways leading to said tag memories is also decreased.

4. An apparatus according to claim 1, wherein even when said access control units decrease the number of ways leading to said second memory devices, the number of ways leading to said tag memories remains fixed.

5. An apparatus according to claim 4, wherein said access control units include destination determination circuits for determining a tag memory to be accessed in response to said access request.

6. An apparatus according to claim 5, wherein said system controller comprises activation request merging circuits for merging activation requests issued from said plurality of access control units for each of said tag interfaces.

7. An apparatus according to claim 6, wherein said system controller comprises result-of-indexing merging circuits for merging results of indexing output from said plurality of tag interfaces for each of said access control units.

8. An apparatus, comprising:
a plurality of processing units each respectively having a cache memory;
a plurality of memory devices;
a plurality of tag memories in which copies of tags of said cache memories are stored; and
a system controller connected to said processing units, memory devices, and tag memories for controlling memory access in response to access requests issued from said processing units, said system controller comprising
a plurality of memory interfaces, each corresponding to one of said memory devices, and each corresponding to one of a plurality of ways,
a plurality of tag interfaces, each connected to one of said tag memories, and each corresponding to one of the plurality of ways, and
a plurality of memory access control units, each corresponding to one of the plurality of ways, for accessing said memory devices on an interleaving basis via said memory interfaces, and accessing said tag memories on the interleaving basis via said tag interfaces.

9. An apparatus according to claim 8, wherein each of said access control units comprises masking circuits each of which, when an address specified in a memory access request corresponds with the way on which the access control unit is installed, passes a memory access request alone, and masks the other memory access requests.

10. An apparatus according to claim 8, wherein said second memory devices are connected to all said memory interfaces, and said tag memories are connected to all said tag interfaces.

* * * * *

UNITED STATES PATENT AND TRADEMARK OFFICE
CERTIFICATE OF CORRECTION

PATENT NO.    : 6,292,870 B1                                      Page 1 of 1
DATED         : September 18, 2001
INVENTOR(S)   : Takaharu Ishizuka et al.

It is certified that error appears in the above-identified patent and that said Letters Patent is hereby corrected as shown below:

<u>Title page,</u>
Item [73], Assignee, change "Fijitsu" to -- Fujitsu --.

Signed and Sealed this

Thirty-first Day of December, 2002

JAMES E. ROGAN
*Director of the United States Patent and Trademark Office*